US008216541B2

(12) United States Patent
Jang et al.

(10) Patent No.: US 8,216,541 B2
(45) Date of Patent: Jul. 10, 2012

(54) PROCESS FOR PRODUCING DISPERSIBLE AND CONDUCTIVE NANO GRAPHENE PLATELETS FROM NON-OXIDIZED GRAPHITIC MATERIALS

(75) Inventors: Bor Z. Jang, Centerville, OH (US); Aruna Zhamu, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 600 days.

(21) Appl. No.: 12/231,411

(22) Filed: Sep. 3, 2008

(65) Prior Publication Data

US 2010/0056819 A1    Mar. 4, 2010

(51) Int. Cl.
*C01B 31/00* (2006.01)

(52) U.S. Cl. ............... 423/448; 423/415.1; 423/445 R; 423/447.1; 423/447.7; 423/460; 423/461; 252/500; 252/502; 977/755; 977/775

(58) Field of Classification Search .......... 252/500–511; 423/445 R–447.3, 415.1, 447.7, 448, 460, 423/461; 977/755, 775
See application file for complete search history.

(56) References Cited

U.S. PATENT DOCUMENTS

| | | | |
|---|---|---|---|
| 2,798,878 A | 7/1957 | Hummers | |
| 4,987,175 A | 1/1991 | Bunnell, Sr. | |
| 5,019,446 A | 5/1991 | Bunnell, Sr. | |
| 5,186,919 A | 2/1993 | Bunnell, Sr. | |
| 5,330,680 A | 7/1994 | Sakawaki et al. | |
| 6,287,694 B1 | 9/2001 | Zaleski et al. | |
| 6,596,396 B2 | 7/2003 | Hirata et al. | |
| 6,828,015 B2 | 12/2004 | Hirata et al. | |
| 6,872,330 B2 | 3/2005 | Mack et al. | |
| 7,071,258 B1 | 7/2006 | Jang et al. | |
| 7,105,108 B2 | 9/2006 | Kaschak et al. | |
| 7,157,517 B2 | 1/2007 | Gulari et al. | |
| 2002/0054995 A1 | 5/2002 | Mazurkiewicz | |
| 2003/0129305 A1 | 7/2003 | Wu et al. | |
| 2010/0028681 A1* | 2/2010 | Dai et al. ....................... 428/408 |
| 2010/0036023 A1* | 2/2010 | Weng et al. ..................... 524/13 |
| 2010/0140792 A1* | 6/2010 | Haddon et al. ................ 257/713 |
| 2011/0014111 A1* | 1/2011 | Leugers et al. ............ 423/415.1 |
| 2011/0052813 A1* | 3/2011 | Ho et al. ....................... 427/256 |

OTHER PUBLICATIONS

U.S. Appl. No. 11/442,903, filed Jun. 26, 2006, B. Z. Jang.
U.S. Appl. No. 10/858,814, filed Jun. 3, 2004, B. Z. Jang, et al.
U.S. Appl. No. 11/007,614, filed Dec. 7, 2006, V. Petrik.
U.S. Appl. No. 11/363,336, filed Feb. 27, 2006, L. T. Drzal, et al.
U.S. Appl. No. 11/361,255, filed Feb. 24, 2006, L. T. Drzal, et al.
U.S. Appl. No. 10/659,577, filed Sep. 10, 2003, L. T. Drzal, et al.
U.S. Appl. No. 11/243,285, filed Oct. 4, 2005, J. D. Udy.
U.S. Appl. No. 11/249,404, filed Oct. 14, 2005, R. Prud'Homme.
U.S. Appl. No. 11/800,728, filed May 8, 2007, A. Zhamu, et al.

(Continued)

*Primary Examiner* — Mark Kopec
*Assistant Examiner* — Tri V Nguyen

(57) ABSTRACT

The present invention provides a process for producing nano graphene platelets (NGPs) that are both dispersible and electrically conducting. The process comprises: (a) preparing a pristine NGP material from a graphitic material; and (b) subjecting the pristine NGP material to an oxidation treatment to obtain the dispersible NGP material, wherein the NGP material has an oxygen content no greater than 25% by weight. Conductive NGPs can find applications in transparent electrodes for solar cells or flat panel displays, additives for battery and supercapacitor electrodes, conductive nanocomposite for electromagnetic wave interference (EMI) shielding and static charge dissipation, etc.

16 Claims, 4 Drawing Sheets

OTHER PUBLICATIONS

Novoselov, K. S., et al. Electric field effect in atomically thin carbon films. Science 306, 666-669 (2004).

Novoselov, K. S., et al. Two dimensional atomic crystals. Proc. Natl. Acad. Sci. 102, 10451-10453 (2005).

McAllister, M. J., et al. Single sheet functionalized graphene by oxidation and thermal expansion of graphite. Chem. Materials 19(18), 4396-4404 (2007).

Li, J. L., et al. Oxygen-driven unzipping of graphitic materials. Phys. Rev. Lett. 96, 176101-1-4 (2006).

Schniepp, H. C., et al. Functionalized single graphene sheets derived from splitting graphite oxide. J. Phys. Chem. B110, 8535-8547 (2006).

Li, X., Wang, X., Zhang, L., Lee, S. & Dai, H., Chemically derived, ultrasmooth graphene nanoribbon semiconductor. Science 319, 1229-1232 (2008).

Bor Z. Jang and A Zhamu, "Processing of Nano Graphene Platelets (NGPs) and NGP Nanocomposites: A Review," J. Materials Sci. 43 (2008) 5092-5101.

Horiuchi, S., et al. Single graphene sheet detected in a carbon nanofilm. Appl. Phys. Lett. 84, 2403-2405 (2004).

Horiuchi, S., et al. Carbon nano-film with a new structure and property. Japan. J. Appl. Phys. Part 2, 42, L1073-L1076 (2003).

Hirata, M., et al Thin-film particles of graphite oxide, 2: preliminary studies for internal micro fabrication of single particle; Carbon 43, 503-510 (2005).

M. Hirata, et al. Thin-film particles of graphite oxide, 1: high yield synthesis and flexibility of the particles. Carbon 42, 2929-2937 (2004).

Hummers, W. S. Preparation of graphitic oxide. J. Am. Chem. Soc. 80, 1339 (1958).

Liu, P. & Gong, K. Synthesis of polyaniline-intercalated graphite oxide by an in situ oxidative polymerization reaction. Carbon 37, 706-707 (1999).

Dekany, I., Kruger-Grasser, R. & Weiaa, A. Selective liquid sorption properties of hydrophobized graphite oxide nanostructures. Colloid Polymer Sci. 276, 570-576 (1998).

Chen, G. H. Preparation and characterization of graphite nanosheets from ultrasonic powdering technique. Carbon 42, 753-759 (2004).

Y. Matsuo, et al.Preparation and characterization of poly(vinyl alcohol)- and Cu(OH) 2-poly(vinyl alcohol)-intercalated graphite oxides. Chem. Materials 10, 2266 (1998).

Xu, J. Y., et al. Thermal analysis of poly(vinyl alcohol)/graphite oxide intercalated polymer composites. Polymer Degradation and Stability 73, 29-31 (2001).

Xu, J. Y. Preparation and characterization of poly(vinyl alcohol)/ graphite oxide nanocomposites. Carbon 40, 445-467 (2002).

Xu, J. Y. et al. Preparation and characterization of polyacrylamide-intercalated graphite oxide. Materials Research Bulletin 36, 1833-1836 (2001).

Xu, J. Y. Structure of poly(acrylic acid)-intercalated graphite oxide. Carbon 40, 2961-2973 (2002).

Liu, P. G., Gong, K., Xiao, P. Preparation and characterization of poly(vinyl acetate)-intercalated graphite oxide nanocomposites. J. Mater. Chem. 10, 933-935 (2002).

Du, X. S., et al. Direct synthesis of poly(arylene disulfide)/carbon nano-sheet composites via the oxidation with graphite oxide. Carbon 43, 195-213 (2005).

Xiao, P., Xiao, M., Liu, P. G. & Gong, K. Direct synthesis of a polyaniline-intercalated graphite oxide nanocomposites. Carbon 38, 626-628 (2000).

Hamwi, A. & Marchand, V. Some chemical and electrochemical properties of graphite oxide. J. Phys. Chem. Solids 57, 867-872 (1996).

Lerf, A., He, H. Y. & Forester, M. Structure of graphite oxide revisited. J. Phys. Chem, B. 102, 4477-4482 (1998).

Matsuo, Y:, Tahara, K. & Sugie, Y. Synthesis of poly(ethylene oxide)-intercalated graphite oxide. Carbon 34, 672-674 (1996).

Kotov, N. Ultrathin graphite oxide-polyelectrolyte composites prepared by self-assembly: transition between conductive and non-conductive states. Adv. Mater. 8, 637-641 (1996).

Matsuo, Y., Tahara, K. & Sugie, Y. Structure and thermal properties of poly (ethylene oxide)-intercalated graphite oxide. Carbon 35 (1), 113-120 (1997).

Cassagneau T., et al. High-density rechargeable Li-ion batteries self-assemble from graphite oxide nanoplatelets and polyelectrolytes. Adv. Materials 10 (11), 877-881 (1998).

Cassagneau T., et al. Preparation and charact. of ultrathin films layer-by-layer self-assembled from GO nanoplatelets and polymers. Langmuir 16, 7318-7324 (2000).

Kovtyukhova,N. I. et al. Layer-by-layer assembly of ultrathin composite films from micron-sized graphite oxide sheets and polycations. Chem. Mater. 11, 771-778 (1999).

Szabo, T., et al. Composite graphitic nanolayers prepared by self-assembly between finely dispersed graphite oxide and a cationic polymer. Carbon 43, 87-94 (2005).

Stankovich, S. Stable aqueous dispersions of graphitic nanoplatelets via reduction of exf. GO in the presence of poly(sodium 4-styrenesulfonate) J. Mater. Chem. 16, 155 (2006.

Stankovich, S., Piner, R. D., Nguyen, S. T. and Ruoff, R. S. Synthesis and exfoliation of isocyanate-treated graphene oxide nanoplatelets. Carbon 44, 3342-3347 (2006).

Li, D., Muller, M. C., Gilje, S., Kaner, R. B. & Wallace, G. Processable aqueous dispersions of graphene nanosheets. Nature Nanotechnology 3, 101-105 (2008).

Y. Si and E. T. Samulski, "Synthesis of Water Soluble Graphene," Nano Letters, 8 (6) (2008) 1679-1682.

Shioyama, H. Cleavage of graphite to graphene. J. Mater. Sci. Lett. 20, 499-500 (2001).

Viculis, L. M., Mack, J. J., & Kaner, R. B. A chemical route to carbon nanoscrolls. Science, 299, 1361 (2003).

Berger, C., et al. Ultrathin epitaxial graphite: 2-D electron gas properties and a route toward graphene-based nanoelectronics. J. Phys. Chem. B 108, 19912-19916 (2004).

Roy, H. V., Kallinger, C., Marsen, B. & Sattler, K. Manipulation of graphitic sheets using a tunneling microscope. J. Appl. Physics 83, (9) 4695-4699 (1998).

Lu, X. K., Yu, M. F., Huang, H., & Ruoff, R. S. Tailoring graphite with the goal of achieving single sheets. Nanotechnology 10, 269-272 (1999).

Land, T. et al. STM investigation of single layer graphite structures produced on Pt(111) by hydrocarbon decomposition. Surf. Sci. 264, 261-270 (1992).

Nagashima, A. et al. Electronic states of monolayer graphite formed on TiC (111) surface. Surf. Sci. 291, 93-98 (1993).

van Bommel, A. J., Crombeen, J. E. & van Tooren, A. Leed and Auger electron observations of the SiC(0001) surface. Surf. Sci. 48, 463-472 (1995).

Forbeaux, I, et al Heteroepitaxial graphite on 6H-SiC(0001): Interface formation through conduction-band electronic structure. Phys. Rev. B 58, 16396-16406 (1998).

Oshima, C. & Nagashima, A. Ultra-thin epitaxial films of graphite and hexagonal boron, J. Condensed Matter, 9, 1-20 (1997).

M. Zhu, J. Wang, R. A. Outlaw, K Hou, D. M. Manos, and B. C. Holloway, Diamond Relat. Mater. 16, 196 (2007).

B. L. French, J. J. Wang, M. Y. Zhu, and B. C. Holloway, Thin Solid Films, 494, 105 (2006).

X. Yang, X. Dou, A. Rouhanipour, L. Zhi, H. J. Raider, and K. Mullen, "Tow-dimensional Graphene Nano-ribbons," J. Am. Chem. Soc. 130 (2008) 4216-17.

H. A. Becerril, et al. "Evaluation of Solution-Processed Reduced Graphene Oxide Films as Transparent Conductors," ACS Nano, 2 (2008) 463-470.

X. Wang, L. Zhi, and K. Muellen, "Transparent, Conductive Graphene Electrodes for Dye-Sensitized Solar Cells," Nano Letters, 8 (2008) 323-327.

Stankovich, S., et al. "Graphene-based composite materials," Nature Letters, 442, 282-286 (2006).

Sandip Niyogi, et al. Solution Properties of Graphite and Graphene, J. Am. Chem. Soc., 128 (24) (2006) 7720-7721.

Worsley, K. A "Soluble Graphene Derived from Graphite Fluoride," Chem. Phys. Lett., 445 (1-3) (2007) 51-56.

Li, J., et al. Conductive graphite nanoplatelet/epoxy nanocomp.: effects of exfol. and UV/Ozone treatment of graphite. Scripta Materialia 53, 235-240 (2005).

Dikin, D. A. Preparation and characterization of graphene oxide paper. Nature Letters 448, 457-460 (2007).

Geim, A. K. & Novoselov, K. S. The rise of grapheme. Nature Materials 6, 183-191 (2007).

* cited by examiner

PROCESS FOR PRODUCING DISPERSIBLE AND CONDUCTIVE NANO GRAPHENE PLATELETS FROM NON-OXIDIZED GRAPHITIC MATERIALS

FIELD OF THE INVENTION

The present invention relates generally to the field of carbon- or graphite-based nano materials, and more particularly to nano graphene platelets (NGPs), including their oxidized versions (graphite oxide nano platelets), that are soluble or dispersible in a liquid medium or a matrix material.

BACKGROUND OF THE INVENTION

The present discussion of the prior art will make reference to the patent literature and technical papers listed at the end of this section.

The nanoscale graphene platelet (NGP) or graphene nanosheet is an emerging class of nano materials. An NGP is a nanoscale platelet composed of one or more layers of a graphene plane, with a platelet thickness from less than 0.34 nm to 100 nm. In a graphene plane, carbon atoms occupy a 2-D hexagonal lattice in which carbon atoms are bonded together through strong in-plane covalent bonds. In the c-axis or thickness direction, several graphene planes may be weakly bonded together through van der Waals forces to form a multi-layer NGP. An NGP may be viewed as a flattened sheet of a carbon nano-tube (CNT), with a single-layer NGP corresponding to a single-wall CNT and a multi-layer NGP corresponding to a multi-wall CNT.

For more than six decades, scientists have presumed that a single-layer graphene sheet (one atom thick) could not exist in its free state based on the reasoning that its planar structure would be thermodynamically unstable. Somewhat surprisingly, several groups worldwide have recently succeeded in obtaining isolated graphene sheets [Refs. 1-9]. NGPs are predicted to have a range of unusual physical, chemical, and mechanical properties. Several unique properties associated with these 2-D crystals have been discovered. In addition to single graphene sheets, double-layer or multiple-layer graphene sheets also exhibit unique and useful behaviors. In the present context, single-layer and multiple-layer graphene sheet structures are collectively referred to as NGPs. Graphene platelets may be oxidized to various extents during their preparation, resulting in graphite oxide (GO) platelets. Hence, although NGPs preferably or primarily refer to those containing no or low oxygen content, they can include GO nano platelets of various oxygen contents.

Although practical electronic device applications for graphene are not envisioned to occur within the next 5-10 years, its application as a nano filler in a composite material is imminent. However, the availability of processable graphene sheets in large quantities is essential to the success in exploiting composite and other applications for graphene. The present patent application addresses issues related to the production of processable or dispersible NGPs.

The processes for producing NGPs and NGP nanocomposites have been recently reviewed by the applicants, Jang and Zhamu [Ref. 9]. Basically, there are four different approaches that have been followed to produce NGPs. Their advantages and shortcomings are briefly summarized as follows:

Approach 1: Formation and Reduction of Graphite Oxide (GO) Platelets

The first approach entails treating a laminar graphite material (e.g., in most cases, natural graphite powder) with an intercalant and an oxidant (e.g., concentrated sulfuric acid and nitric acid, respectively) to obtain a graphite intercalation compound (GIC) or, actually, graphite oxide (GO). The obtained GIC or GO is then subjected to exfoliation using either a thermal shock exposure or a solution-based graphene layer separation approach.

Technically, the acid-treated graphite is actually oxidized graphite or graphite oxide (GO), rather than pristine graphite. In the thermal shock exposure approach, the GIC or GO is exposed to a high temperature (typically 800-1,050° C.) for a short period of time (typically 15 to 60 seconds) to exfoliate the treated graphite. Typically, the exfoliated graphite oxide is then subjected to a further sheet or flake separation treatment using air milling, mechanical shearing, or ultrasonication in a liquid (e.g., water).

In the solution-based graphene separation approach, the GO powder is dispersed in water or aqueous alcohol solution, which is subjected to ultrasonication. Alternatively, the GO powder dispersed in water is subjected to some kind of ion exchange or purification procedure in such a manner that the repulsive forces between ions residing in the inter-planar spaces overcome the inter-graphene van der Waals forces, resulting in graphene layer separations.

In both the heat- or solution-induced exfoliation approaches, the resulting products are GO platelets that must undergo a further chemical reduction treatment to reduce (but normally not eliminate) the oxygen content. Typically even after reduction, the electrical conductivity of GO platelets remains much lower than that of pristine graphene. Furthermore, the reduction procedure often involves the utilization of undesirable chemicals, such as hydrazine. In some cases of solution-based exfoliation, the separated and dried GO platelets were re-dispersed in water and then cast into thin GO films. These films were exposed to a high temperature, high vacuum environment for de-oxygenation, but the resulting GO platelets were no longer dispersible in water or other solvents.

Examples of Approach 1 are briefly discussed below:
  (a) Bunnell [10-12] developed a method in late 1988 that entailed intercalating graphite with a strong acid to obtain a GIC, thermally exfoliating the GIC to obtain discrete layers of graphite, and then subjecting the graphite layers to ultrasonic energy, mechanical shear forces, or freezing to separate the layers into discrete flakes. Although flakes as small as 10 nm were cited in the report [12], most of the flakes presented in the examples appeared to be thicker than 100 nm.
  (b) In a similar manner, Zaleski, et al. [13] used air milling to further delaminate thermally exfoliated graphite flakes. The resulting structures exhibited a specific surface area of 35 $m^2/g$, corresponding to an average flake thickness of approximately 25 nm.
  (c) Horiuchi, Hirata, and co-workers [14-19] prepared nano-scaled graphite oxide (GO) platelets, which they coined as carbon nano-films. These films were prepared by a two-step process—oxidation of graphite and purification of the resulting graphite oxide. The oxidation of graphite was conducted using the now well-known Hummer's method [20,21], which entailed immersing natural graphite particles in a mixture of $H_2SO_4$, $NaNO_3$, and $KMnO_4$ to obtain GICs that actually were GOs. By hydrolyzing the GIC, functional groups, such as acidic hydroxyl groups and ether groups, were introduced into the inter-graphene layer spaces. Each of the graphite oxide layers became a multiple-charge anion, having a thickness of approximately 0.6 nm. When the excess small ions derived from the oxidants (e.g., $NaNO_3$, and $KMnO_4$) were thoroughly removed by a purification process, many layers tended to automatically separate from each other due to interlayer electrostatic repulsion. The resulting GO layers formed a stable dispersion in water. According to Horiuchi, et al. [14], single-layer graphene was detected.

(d) It may be noted that the approach of using electrostatic repulsion to separate graphene oxide layers was pursued earlier in 1998 by Liu and Gong [22], as a first step in their attempt to synthesize polyaniline-intercalated GO. In a 3-D graphite crystal, the inter-layer spacing (Ld) is 0.335 nm, which is known to increase to 0.6-1.1 nm if graphite is oxidized to produce GO. Further, GO is hydrophilic and can be readily dispersed in aqueous solution.

(e) Dekany et al. [23] observed that the inter-graphene spacing in GO was increased to $L_d=1.23$ nm when GO particles were dispersed in 0.05 N NaOH solution. When dispersed in a 0.01 N NaOH solution, the spacing was essentially infinite, likely implying that GO was completely exfoliated to become a disordered structure.

(f) Chen et al. [24] exposed GO to a temperature of 1,050° C. for 15 seconds to obtain exfoliated graphite, which was then subjected to ultrasonic irradiation in a mixture solution of water and alcohol.

(g) Jang et al. [25] thermally expanded GIC or graphite oxide to produce exfoliated graphite and subjected exfoliated graphite to mechanical shearing treatments, such as ball milling, to obtain partially oxidized NGPs.

(h) Thermal exfoliation as a way of producing nano-structured graphite was also attempted by Petrik [26].

(i) Thermal exfoliation of intercalated graphite or graphite oxide was conducted by Drzal et al. [27] using microwaves as a heat source.

(j) Aksay, McAllister, and co-workers [7-9, 66] also used thermal exfoliation of GO to obtain exfoliated graphite oxide platelets, which were found to contain a high proportion of single-layer graphene oxide sheets, based on the BET method with nitrogen gas adsorption in the dry state and in an ethanol suspension with methylene blue dye as a probe.

(k) Several polar organic compounds and polymers have been intercalated into inter-graphene or inter-flake spaces to form intercalated or exfoliated GO nanocomposites. These include poly(vinyl alcohol) [28-30], poly (acrylamide) [31], and poly(acrylic acid) [32]. Intercalation of hydrophobic polymers, such as poly(vinyl acetate) [33], into GO was also achieved by in situ polymerization. Partial reduction of a polymer-GO to a polymer-graphene nanocomposite also could be accomplished electrochemically or chemically [22,34-37].

(l) Preparation of ultra-thin films by a layer-by-layer self-assembly approach from GO nano platelets and polymer electrolytes also has been investigated [38-44]. Although the original intent of these studies was primarily to fabricate self-assembled GO-poly(ethylene oxide) nanocomposites, their first step almost always involved exfoliation and separation of GO platelets. This was evidenced by the X-ray diffraction data of the resulting structures that showed complete disappearance of those diffraction peaks corresponding to graphite oxide or pristine graphite [38,40].

(m) Stankovich et al. [45] followed the approaches of Hirata et al. [17-19] to produce and disperse graphite oxide sheets in water to obtain stable colloidal dispersions. The graphite oxide dispersion was then reduced with hydrazine, a procedure previously used by Liu and Gong earlier [22], but in the presence of poly(sodium 4-styrenesulfonate). This process led to the formation of a stable aqueous dispersion of polymer-coated graphene platelets. Stankovich et al. [46] further developed a method to produce less hydrophilic GO platelets using an isocyanate treatment. However, unless stabilized by selected polymers, the chemically modified graphene sheets obtained through these methods tend to precipitate as irreversible agglomerates due to their hydrophobic nature. The resulting agglomerates became insoluble in water and organic solvents.

(n) Li et al. [47] overcame this issue by using ammonium to adjust the pH value of a dispersion of chemically modified graphene sheets in water, which served to maximize the charge density on the resulting graphene sheets. The resulting electrostatic forces acted to stabilize the aqueous suspension.

(o) Si and Samulski [48] reported a chemical route to aqueous solutions of isolated graphene sheets by reducing graphene oxide in three steps. (1) pre-reduction of graphene oxide with sodium borohydride at 80° C. for 1 h to remove the majority of the oxygen functionality; (2) sulfonation with the aryl diazonium salt of sulfanilic acid in an ice bath for 2 h; and (3) post-reduction with hydrazine (100° C. for 24 h) to remove any remaining oxygen functionality. The lightly sulfonated graphene can be readily dispersed in water at reasonable concentrations (2 mg/mL) in the pH range of 3-10. Isolated graphene sheets persist in the mixture of water and organic solvents including methanol, acetone, acetonitrile, thus making it possible to further modify its surface for applications such as reinforcements in composites. This is a very tedious process, nevertheless.

(p) Another very tedious process for the preparation of GO nano sheets, proposed by Becerril, et al. [67], entailed (1) intercalating-oxidizing graphite with a solution of $NaNO_3$ and $KMnO_4$ in concentrated $H_2SO_4$ for 5 days; (2) washing the oxidized graphite with 5 wt. % $H_2SO_4$ in water and reacting the washed oxidized graphite with a 30 wt. % aqueous solution of $H_2O_2$ to complete the oxidation; (3) removing inorganic anions and other impurities through 15 washing cycles that included centrifugation, discarding supernatant liquid, and re-suspending the solid in an aqueous mixture of 3 wt. % $H_2SO_4$ and 0.5 wt. % $H_{2O2}$ using stirring and ultrasonication; (4) carrying out another set of centrifugation and washing procedures three times using 3 wt % HCl in water as the dispersion medium and then one more time using purified water to re-suspend the solid; (5) passing this suspension through a weak basic ion-exchange resin to remove remaining acid; and (6) drying the suspension to obtain a powder.

Approach 2: Direct Formation of Pristine Nano Graphene Platelets (q) Without going through a chemical intercalation route, Mazurkiewicz [49] claimed to have produced graphite nano platelets having an average thickness in the range of 1-100 nm through high-pressure milling of natural flake graphite. However, no evidence was presented [49] to show that truly thin platelets (e.g., those <10 nm in thickness) were produced.

(r) Shioyama [50] prepared a potassium-intercalated GIC from highly oriented pyrolytic graphite (HOPG), initiated in situ polymerization of isoprene or styrene in the inter-graphene spaces, and then thermally decomposed inter-graphene polymer chains at a high temperature (500-1,000° C). The volatile gas molecules served to exfoliate graphite layers, and, after the volatile gas escaped, isolated graphene sheets were obtained. Unfortunately, Shioyama did not discuss the thickness of the isolated graphene sheets.

(s) Jang, et al. [3,4] succeeded in isolating single-layer and multi-layer graphene structures from partially carbonized or graphitized polymeric carbons, which were obtained from a polymer or pitch precursor. Carbonization involves linking aromatic molecules or planar cyclic chains to form graphene domains or islands in an essentially amorphous carbon matrix. For instance, polymeric carbon fibers were obtained by carbonizing polyacrylonitrile (PAN) fibers to a desired extent that the fiber was composed of individual graphene sheets isolated or separated from each other by an amorphous carbon matrix. The resulting fibers were then subjected to a solvent extraction, or intercalation/exfoliation treatment. Graphene platelets were then extracted from these fibers using a ball milling procedure.

(t) Mack, Viculis, and co-workers [51,52] developed a low-temperature process that involved intercalating graphite with potassium melt and contacting the resulting K-intercalated graphite with alcohol, producing violently exfoliated graphite containing many ultra-thin NGPs. The process must be carefully conducted in a vacuum or an extremely dry glove box environment since pure alkali metals, such as potassium and sodium, are extremely sensitive to moisture and pose an explosion danger. It is questionable if this process is easily amenable to the mass production of nano-scaled platelets. One major advantage of this process is the notion that it produces non-oxidized graphene sheets since no acid/oxidizer intercalation or a high temperature is involved.

(u) In 2004, Novoselov, Geim, and co-workers [1,2] prepared single-sheet graphene by removing graphene from a graphite sample one sheet at a time using a "Scotch-tape" method. Although this method is not amenable to large-scale production of NGPs, their work did spur globally increasing interest in nano graphene materials, mostly motivated by the thoughts that graphene could be useful for developing novel electronic devices.

(v) Zhamu and Jang [75] developed a very effective way of exfoliating/separating NGPs from natural graphite and other laminar graphitic materials by exposing the material (without any intercalation or oxidation) to an ultra-sonication treatment. This process may be considered as peeling off graphene layers at a rate of 20,000 layers per second (if the ultrasonic frequency is 20 kHz) or higher (if higher frequency). The resulting NGPs are pristine graphene without any intentionally added or bonded oxygen.

Approach 3: Epitaxial Growth and Chemical Vapor Deposition of Nano Graphene Sheets on Inorganic Crystal Surfaces (w) Small-scale production of ultra-thin graphene sheets on a substrate can be obtained by thermal decomposition-based epitaxial growth [53] and a laser desorption-ionization technique [54]. A scanning probe microscope was used by Roy et al. [55] and by Lu et al. [56] to manipulate graphene layers at the step edges of graphite and etched HOPG, respectively, with the goal of fabricating ultra-thin nano-structures. It was not clear if single graphene sheets were obtained using this technique by either group. Epitaxial films of graphite with only one or a few atomic layers are of technological and scientific significance due to their peculiar characteristics and great potential as a device substrate [57-63]. The graphene sheets produced are meant to be used for future nano-electronic applications, rather than composite reinforcements.

Approach 4: The Bottom-Up Approach (Synthesis of Graphene from Small Molecules)

(x) X. Yang, et al. [65] synthesized nano graphene sheets with lengths of up to 12 nm using a method that began with Suzuki-Miyaura coupling of 1,4-diiodo-2,3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets.

There are several major issues associated with the aforementioned processes:

(1) The GO nano platelets prepared by Approach 1, albeit dispersible in water and several other polar liquids such as ethanol and acetone, are not dispersible in a wide range of organic solvents.

(2) The GO nano platelets exhibit an electrical conductivity typically several orders of magnitude lower than the conductivity of pristine NGPs. Even after chemical reduction, the GO still exhibits a much lower conductivity than pristine NGPs. It appears that the preparation of intercalated graphite, which involves the oxidizing agent such as nitric acid or potassium permanganate, typically and necessarily requires graphite to be heavily oxidized. Complete reduction of these highly oxidized graphite platelets hitherto has not been successfully attained.

(3) The GO nano platelets, after a high degree of chemical reduction, are able to recover some of the properties of pristine graphite, but are typically no longer dispersible in water and most of the organic solvents.

(4) The NGPs produced by Approach 2 and Approach 3 are normally pristine graphene and highly conducting. However, pristine NGPs, just like reduced GO platelets, are typically not soluble or dispersible in water or other organic solvents. It is also difficult to homogeneously mix or disperse pristine NGPs in a polymer matrix. These features make it difficult to fabricate nanocomposite parts with good filler dispersion or good filler-matrix interfacial bonding, which are essential to the realization of good composite properties.

Hence, it is an object of the present invention to provide a nano graphene platelet material that is soluble or dispersible in a range of organic solvents while maintaining good properties of pristine graphene (e.g., good electrical or thermal conductivity).

It is another object of the present invention to provide a processable nano graphene platelet material that can be dispersed in a range of polymer matrices to form nanocomposites of desirable properties (e.g., achieving good electrical, thermal, or mechanical properties).

References Cited

1. Novoselov, K. S., et al. Electric field effect in atomically thin carbon films. *Science* 306, 666-669 (2004).
2. Novoselov, K. S., et al. Two dimensional atomic crystals. *Proc. Natl. Acad. Sci.* 102, 10451-10453 (2005).
3. Jang, B. Z. & Huang, W. C. Nano-scaled grapheme plates. U.S. Pat. No. 7,071,258, (submitted on Oct. 21, 2002 and issued on Jul. 4, 2006).
4. Jang, B. Z. Process for nano-scaled graphene plates. U.S. patent application Ser. No. 11/442,903 (Jun. 20, 2006); a divisional of Ser. No. 10/274,473 (Oct. 21, 2002).
5. McAllister, M. J., et al. Single sheet functionalized graphene by oxidation and thermal expansion of graphite. *Chem. Materials* 19(18), 4396-4404 (2007).

6. Li, J. L., et al. Oxygen-driven unzipping of graphitic materials. *Phys. Rev. Lett.* 96, 176101-1-4 (2006).
7. Schniepp, H. C., et al. Functionalized single graphene sheets derived from splitting graphite oxide. *J. Phys. Chem. B* 110, 8535-8547 (2006).
8. Li, X., Wang, X., Zhang, L., Lee, S. & Dai, H., Chemically derived, ultrasmooth graphene nanoribbon semiconductor. *Science* 319, 1229-1232 (2008).
9. Bor Z. Jang and A Zhamu, "Processing of Nano Graphene Platelets (NGPs) and NGP Nanocomposites: A Review," *J. Materials Sci.* 43 (2008) 5092-5101.
10. Bunnell, Sr. L. R. Enhancement of the mechanical properties by graphite flake addition. U.S. Pat. No. 4,987,175 (Jan. 22, 1991).
11. Bunnell, Sr. L. R. Enhancement of mechanical properties of polymers by thin flake addition and apparatus for producing such thin flakes. U.S. Pat. No. 5,019,446 (May 28, 1991).
12. Bunnell, Sr. L. R. Method for producing thin graphite flakes with large aspect ratios. U.S. Pat. No. 5,186,919 (Feb. 16, 1993).
13. Zaleski, P. L., et al. Method for expanding lamellar forms of graphite and resultant product. U.S. Pat. No. 6,287,694 (Sep. 11, 2001).
14. Horiuchi, S., et al. Single graphene sheet detected in a carbon nanofilm. *Appl. Phys. Lett.* 84, 2403-2405 (2004); paper received on 8 Sep. 2003.
15. Horiuchi, S., et al. Carbon nano-film with a new structure and property. *Japan. J. Appl. Phys.* Part 2, 42, L1073-L1076 (2003).
16. Hirata, M. & Horiuchi, S. Thin-film-like particles having skeleton constructed by carbons and isolated films," U.S. Pat. No. 6,596,396 (Jul. 22, 2003).
17. Hirata, M. & Horiuchi, S. Composites containing thin-film particles having carbon skeleton, method of reducing the thin-film particles, and process for the production of the composite. U.S. Pat. No. 6,828,015 (Dec. 7, 2004).
18. Hirata, M., Gotou, T. & Ohba, M. Thin-film particles of graphite oxide, 2: preliminary studies for internal micro fabrication of single particle and carbonaceous electronic circuits. *Carbon* 43, 503-510 (2005).
19. Hirata, M., Gotou, T., Horiuchi, S., Fujiwara, M. & Ohba, M. Thin-film particles of graphite oxide, 1: high yield synthesis and flexibility of the particles. *Carbon* 42, 2929-2937 (2004).
20. Hummers, W. S. Preparation of graphitic acid. U.S. Pat. No. 2,798,878, Jul. 9, 1957.
21. Hummers, W. S. Preparation of graphitic oxide. *J. Am. Chem. Soc.* 80, 1339 (1958).
22. Liu, P. & Gong, K. Synthesis of polyaniline-intercalated graphite oxide by an in situ oxidative polymerization reaction. *Carbon* 37, 706-707 (1999).
23. Dekany, I., Kruger-Grasser, R. & Weiaa, A. Selective liquid sorption properties of hydrophobized graphite oxide nanostructures. *Colloid Polymer Sci.* 276, 570-576 (1998).
24. Chen, G. H. Preparation and characterization of graphite nanosheets from ultrasonic powdering technique. *Carbon* 42, 753-759 (2004).
25. Jang, B. Z., Wong, S. C. & Bai, Y. Process for producing nano-scaled graphene plates," U.S. patent application Ser. No. 10/858,814 (Jun. 3, 2004); Pub. No. US 2005/0271574 (Pub. Dec. 8, 2005).
26. Petrik, V. 1. Mass production of carbon nanostructures. U.S. patent application Ser. No. 11/007,614 (Dec. 7, 2004); Publ No. US 2006/0121279 (Pub. Jun. 8, 2006).
27. Drzal L. T. & Fukushima, H. Expanded graphite and products produced therefrom. U.S. patent application Ser. No. 11/363,336 (Feb. 27, 2006); Ser. No. 11/361,255 (Feb. 24, 2006); Ser. No. 10/659,577 (Sep. 10, 2003).
28. Matsuo, Y., Tahara, K. & Sugie, Y. Preparation and characterization of poly(vinyl alcohol)- and $Cu(OH)_2$-poly(vinyl alcohol)-intercalated graphite oxides. *Chem. Materials* 10, 2266-2269 (1998).
29. Xu, J. Y., et al. Thermal analysis of poly(vinyl alcohol)/graphite oxide intercalated polymer composites. *Polymer Degradation and Stability* 73, 29-31 (2001).
30. Xu, J. Y. Preparation and characterization of poly(vinyl alcohol)/graphite oxide nanocomposites. *Carbon* 40, 445-467 (2002).
31. Xu, J. Y., Hu, Y., Song, L., Wang, Q. G. & Fang, W. C. Preparation and characterization of polyacrylamide-intercalated graphite oxide. *Materials Research Bulletin* 36, 1833-1836 (2001).
32. Xu, J. Y. Structure of poly(acrylic acid)-intercalated graphite oxide. *Carbon* 40, 2961-2973 (2002).
33. Liu, P. G., Gong, K., Xiao, P. & Xiao, M. Preparation and characterization of poly(vinyl acetate)-intercalated graphite oxide nanocomposites. *J. Mater. Chem.* 10, 933-935 (2002).
34. Du, X. S., Xiao, M., Meng, Y. Z. & Hay, A. S. Direct synthesis of poly(arylene disulfide)/carbon nano-sheet composites via the oxidation with graphite oxide. *Carbon* 43, 195-213 (2005).
35. Xiao, P., Xiao, M., Liu, P. G. & Gong, K. Direct synthesis of a polyaniline-intercalated graphite oxide nanocomposites. *Carbon* 38, 626-628 (2000).
36. Hamwi, A. & Marchand, V. Some chemical and electrochemical properties of graphite oxide. *J. Phys. Chem. Solids* 57, 867-872 (1996).
37. Lerf, A., He, H. Y. & Forester, M. Structure of graphite oxide revisited. *J. Phys. Chem, B.* 102, 4477-4482 (1998).
38. Matsuo, Y., Tahara, K. & Sugie, Y. Synthesis of poly (ethylene oxide)-intercalated graphite oxide. *Carbon* 34, 672-674 (1996).
39. Kotov, N. A., Dekany, I. & Fendler, J. H. Ultrathin graphite oxide-polyelectrolyte composites prepared by self-assembly: transition between conductive and non-conductive states. *Adv. Mater.* 8, 637-641 (1996).
40. Matsuo, Y., Tahara, K. & Sugie, Y. Structure and thermal properties of poly(ethylene oxide)-intercalated graphite oxide. *Carbon* 35 (1), 113-120 (1997).
41. Cassagneau, T. & Fendler, J. H. High-density rechargeable lithium-ion batteries self-assemble from graphite oxide nanoplatelets and polyelectrolytes. *Adv. Materials* 10 (11), 877-881 (1998).
42. Cassagneau T., Guerin, F. & Fendler, J. H. Preparation and characterization of ultrathin films layer-by-layer self-assembled from graphite oxide nanoplatelets and polymers. *Langmuir* 16, 7318-7324 (2000).
43. Kovtyukhova, N. I. et al. Layer-by-layer assembly of ultrathin composite films from micron-sized graphite oxide sheets and polycations. *Chem. Mater.* 11, 771-778 (1999).
44. Szabo, T., Szeri, A. & Dekany, I. Composite graphitic nanolayers prepared by self-assembly between finely dispersed graphite oxide and a cationic polymer. *Carbon* 43, 87-94 (2005).
45. Stankovich, S. Stable aqueous dispersions of graphitic nanoplatelets via the reduction of exfoliated graphite oxide in the presence of poly(sodium 4-styrenesulfonate). *J. Mater. Chem.* 16, 155-158 (2006).

46. Stankovich, S., Piner, R. D., Nguyen, S. T. and Ruoff, R. S. Synthesis and exfoliation of isocyanate-treated graphene oxide nanoplatelets. *Carbon* 44, 3342-3347 (2006).
47. Li, D., Muller, M. C., Gilje, S., Kaner, R. B. & Wallace, G. Processable aqueous dispersions of graphene nanosheets. *Nature Nanotechnology* 3, 101-105 (2008).
48. Y. Si and E. T. Samulski, "Synthesis of Water Soluble Graphene," Nano Letters, 8 (6) (2008) 1679-1682.
49. Mazurkiewicz, M. Graphite platelet nanostructures. U.S. patent application Ser. No. 09/951,532,; Pub. No. US 2002/0054995 (Published on May 9, 2002).
50. Shioyama, H. Cleavage of graphite to graphene. *J. Mater. Sci. Lett.* 20, 499-500 (2001).
51. Mack, J. J. et al. Chemical manufacture of nanostructured materials. U.S. Pat. No. 6,872,330 (Mar. 29, 2005).
52. Viculis, L. M., Mack, J. J., & Kaner, R. B. A chemical route to carbon nanoscrolls. *Science*, 299, 1361 (2003).
53. Berger, C., et al. Ultrathin epitaxial graphite: two-dimensional electron gas properties and a route toward graphene-based nanoelectronics. *J. Phys. Chem.* B 108, 19912-19916 (2004).
54. Udy, J. D. Method of continuous, monoatomic thick structures. U.S. patent application Ser. No. 11/243,285 (Oct. 4, 2005); Pub No. 2006/0269740 (Nov. 30, 2006).
55. Roy, H. V., Kallinger, C., Marsen, B. & Sattler, K. Manipulation of graphitic sheets using a tunneling microscope. *J. Appl. Physics* 83, (9) 4695-4699 (1998).
56. Lu, X. K., Yu, M. F., Huang, H., & Ruoff, R. S. Tailoring graphite with the goal of achieving single sheets. *Nanotechnology* 10, 269-272 (1999).
57. Land, T. A., Michely, T., Behm, R. J., Hemminger, J. C. & Comsa, G. STM investigation of single layer graphite structures produced on Pt(111) by hydrocarbon decomposition. *Surf Sci.* 264, 261-270 (1992).
58. Nagashima, A. et al. Electronic states of monolayer graphite formed on TiC (111) surface. *Surf Sci.* 291, 93-98 (1993).
59. van Bommel, A. J., Crombeen, J. E. & van Tooren, A. LEED and Auger electron observations of the SiC(0001) surface. *Surf Sci.* 48, 463-472 (1995).
60. Forbeaux, I., Themlin, J.-M. & Debever, J. M. Heteroepitaxial graphite on 6H—SiC(0001): Interface formation through conduction-band electronic structure. *Phys. Rev. B* 58, 30 16396-16406 (1998).
61. Oshima, C. & Nagashima, A. Ultra-thin epitaxial films of graphite and hexagonal boron," *J. Condensed Matter*, 9, 1-20 (1997).
62. Wu, Y. & Chong, C. Two-dimensional nano-sized structures and apparatus and methods for their preparation. U.S. patent application Ser. No. 10/124,188 (US Pub. No. 2003/0129305, Jul. 10, 2003).
63. M. Zhu, J. Wang, R. A. Outlaw, K. Hou, D. M. Manos, and B. C. Holloway, Diamond Relat. Mater. 16, 196 (2007).
64. B. L. French, J. J. Wang, M. Y. Zhu, and B. C. Holloway, Thin Solid Films, 494, 105 (2006).
65. X. Yang, X. Dou, A. Rouhanipour, L. Zhi, H. J. Raider, and K. Mullen, "Tow-dimensional Graphene Nano-ribbons," J. Am. Chem. Soc. 130 (2008) 4216-17.
66. Prud'Homme, R. K., Aksay, I. A., Adamson, D. & Abdala, A. Thermally exfoliated graphite oxide. U.S. patent application Ser. No. 11/249,404 (Oct. 14, 2005); Pub No. US 2007/0092432 (Apr. 26, 2007).
67. H. A. Becerril, J. Mao, Z. Liu, R. M. Stoltenberg, Z. Bao, and Y. Chen, "Evaluation of Solution-Processed Reduced Graphene Oxide Films as Transparent Conductors," ACS Nano, 2 (2008) 463-470.
68. X. Wang, L. Zhi, and K. Muellen, "Transparent, Conductive Graphene Electrodes for Dye-Sensitized Solar Cells," Nano Letters, 8 (2008) 323-327.
69. Stankovich, S., et al. "Graphene-based composite materials," *Nature Letters*, 442, 282-286 (2006).
70. Sandip Niyogi, Elena Bekyarova, Mikhail E. Itkis, Jared L. McWilliams, Mark A. Hamon, and Robert C. Haddon, "Solution Properties of Graphite and Graphene, *J. Am. Chem. Soc.*, 128 (24) (2006) 7720-7721.
71. Worsley, K. A.; Ramesh, P.; Mandal, S. K.; Niyogi, S.; Itkis, M. E.; Haddon, R. C. "Soluble Graphene Derived from Graphite Fluoride," *Chem. Phys. Lett.*, 445 (1-3) (2007) 51-56.
72. Li, J., Kim, J. K. & Sham, M. L. Conductive graphite nanoplatelet/epoxy nanocomposites: effects of exfoliation and UV/Ozone treatment of graphite. *Scripta Materialia* 53, 235-240 (2005).
73. Dikin, D. A. Preparation and characterization of graphene oxide paper. *Nature Letters* 448, 457-460 (2007).
74. Geim, A. K. & Novoselov, K. S. The rise of grapheme. *Nature Materials* 6, 183-191 (2007).
75. Aruna Zhamu, Jinjun Shi, Jiusheng Guo and Bor Z. Jang, "Method of Producing Exfoliated Graphite, Flexible Graphite, and Nano-Scaled Graphene Plates," U.S. patent application Ser. No. 11/800,728 (May 8, 2007).
76. D. M. Kaschak, et al., "Graphite Intercalation and Exfoliation Process," U.S. Pat. No. 7,105,108 (Sep. 12, 2006).
77. E. Gulari, et al., "Method of Delaminating a Graphite Structure with a Coating Agent in a Supercritical Fluid," U.S. Pat. No. 7,157,517 (Jan. 2, 2007).

SUMMARY OF THE INVENTION

The present invention provides a process for producing soluble or dispersible nano graphene platelet (NGP) materials that are highly conducting, without having to go through a chemical reduction procedure. The electrical conductivity of NGPs in the present context was measured after the NGPs were formed into a thin film. In one preferred embodiment, the process comprises: (a) preparing a pristine NGP material from a graphitic material; and (b) subjecting the pristine NGP material to an oxidation treatment to obtain the dispersible NGP material, wherein the NGP material has an oxygen content no greater than 25% by weight. Preferably, the NGP material has an oxygen content no less than 5% by weight. A most preferred oxygen content range is from approximately 10% to 20% by weight.

The graphitic material is selected from the group consisting of natural graphite, artificial graphite, graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof. The pristine NGP material is preferably produced by a process comprising a procedure selected from: (A) intercalating the graphitic material with a non-oxidizing agent, followed by a thermal or chemical exfoliation treatment in a non-oxidizing environment; (B) subjecting the graphitic material to a supercritical fluid environment for inter-graphene layer penetration and exfoliation; (C) dispersing the graphitic material in a powder form to an aqueous solution containing a surfactant or dispersing agent to obtain a suspension and subjecting the suspension to direct ultrasonication; or a combination thereof. Any of these three procedures can lead to the production of pristine or un-oxidized NGPs.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing K-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce the separated nano-scaled platelets, which are pristine, non-oxidized NGPs.

It may be noted that although Kaschak, et al. [76] proposed a method of modifying graphite by introducing a supercritical fluid into interstices of graphite flake, the graphite flake used was intercalated or intercalated/oxidized graphite (rather than the original natural graphite). The interstices of intercalated/oxidized graphite had been expanded and chemically modified due to the presence of intercalant species (such as sulfuric acid) or oxidation-induced functional groups (such as carboxyl). Kaschak, et al. did not teach the approach of directly intercalating natural (un-treated) graphite flake with a supercritical fluid; nor did they teach the approach of intercalating and exfoliating graphite using the same supercritical fluid. The modified graphite as proposed by Kaschak, et al. [76] still required a high temperature exposure step, typically at 700-1,200° C., to exfoliate the intercalated and modified graphite. Furthermore, they really did not provide any evidence to show the existence of nano-scaled graphite particles that they claimed they produced with this method. In particular, they claimed that "one advantage of the invention is that the aforementioned methods may be used to manufacture graphite in a form that has a thickness of less than about 10 microns, preferably less than about 1 micron, more preferably less than about 100 nm, even more preferably less than about 10 nm, and most preferably less than about 1 nm." However, they did not fairly suggest the conditions under which graphite particles with a thickness less than 10 nm or 1 run could be produced. This was truly a big claim and should have been supported by solid experimental evidence; unfortunately, absolutely no evidence whatsoever was presented.

Gulari, et al. [77] proposed a method of delaminating a graphite structure with a coating agent solubilized in a supercritical fluid. The coating agent was a polymer, monomer, or oil, according to Gulari, et al. The method comprises diffusing a coating agent in a supercritical fluid between layered particles of a graphite structure and catastrophically depressurizing the supercritical fluid to delaminate the coated graphite particles. However, Gultari, et al. [76] failed to mention anything about the thickness of the delaminated particles. It was not clear if and how graphite platelets with a thickness less than 100 nm could be produced with this method. Gulari, et al. presumed that a coating agent was needed to prevent the-reformation of the covalent bonds between graphite particles when they were broken during delamination. This is rather confusing or misleading since it is well-known that the bonding between graphite layers is van der Waals force rather than covalent bond. Furthermore, a coating agent is problematic if a pure graphene product is desired. Gulari, et al. [77] did not teach if a supercritical fluid without a coating agent solubilized therein would be capable of delaminating graphite layers.

Neither Kaschak, et al. [76] nor Gulari, et al. [77] mentioned anything about the properties of the resulting exfoliated graphite. It was not clear if their graphite products were conductive or soluble in a solvent.

By contrast, after an intensive research and development effort, we have found that a supercritical fluid, alone without a coating agent, was capable of both intercalating and exfoliating a graphitic material without involving an additional intercalation or oxidation step (as required in Kaschak, et al. [76]). Further, this supercritical fluid-based process is capable of producing nano graphene platelets that are ultra-thin (<10 nm) and, in many cases, thinner than 1 nm.

As a second step of the presently invented process, the oxidation treatment comprises subjecting the pristine NGP material to an oxidizing agent preferably selected from ozone, sulfonic ($SO_3$) vapor, an oxygen-containing gas, hydrogen peroxide vapor, nitric acid vapor, or a combination thereof. Preferably, the treatment comprises subjecting the pristine NGP material to an oxidizing agent in a hydrogen-containing environment. Although oxidation treatment can be conducted by immersing NGPs in a liquid acid and/or oxidizer environment, such a procedure requires a subsequent water-rinsing and purification step (such a rinsing procedure is not as tedious as required in the case of conventional sulfuric acid-intercalation graphite, nevertheless). Hence, a gaseous treatment requiring no post-treatment rinsing is preferred.

A primary goal of the oxidation treatment is to impart solubility or dispersibility to the obtained pristine NGPs without a significant compromise in electrical conductivity. After an extensive and in-depth study we have come to discover that dispersible and conductive NGPs can be produced with an NGP oxygen content no greater than 25% by weight, preferably below 20% by weight, further preferably between 5% and 20% by weight. The oxygen content can be determined using chemical elemental analysis and/or X-ray photoelectron spectroscopy (XPS).

For the purpose of facilitating discussion, we may define those graphite platelets having an oxygen content higher than 15% by weight as GO nano platelets and those lower than approximately 15% as nano graphene. The pristine nano graphene refers to those NGPs that have an oxygen content less than 1% by weight. Hence, the present process provides GO (>15% by wt. O), nano graphene ($\leq$15% by wt. O), and pristine nano graphene ($\leq$1% by wt. O).

The NGPs or GO platelets prepared with this process, when formed directly into a thin film with a thickness no greater than 100 nm, typically maintain an electrical conductivity of at least 100 S/cm and, in many cases, greater than 1,000 S/cm. With an oxygen content no greater than 25% by weight, typically the NGP thin film exhibits an electrical conductivity no less than 1 S/cm.

The graphitic material, for the preparation of pristine NGPs, may be selected from the group consisting of natural graphite, artificial graphite (e.g., highly oriented pyrolytic graphite, HOPG), graphite oxide, graphite fluoride, graphite fiber, carbon fiber, carbon nano-fiber, carbon nano-tube, mesophase carbon micro-bead (MCMB) or carbonaceous micro-sphere (CMS), graphitized soft carbon, hard carbon, and combinations thereof. MCMBs or CMS are usually obtained from a petroleum heavy oil or pitch, coal tar pitch, or polynuclear hydrocarbon material (highly aromatic molecules). When such a precursor pitch material is carbonized by heat treatment at 400° to 550°, micro-crystals called mesophase micro-spheres are formed in a non-crystalline pitch matrix. These mesophase micro-spheres, after being isolated from the pitch matrix (which is typically soluble in selected solvents), are often referred to as meso-carbon micro-beads (MCMB). The MCMBs commercially available are those that have been subjected to a further heat treatment at a temperature in the range of 2,000° C. and 3,000° C.

In many cases, the NGPs produced in our studies have a specific surface area in the range of approximately 300 $m^2/g$ to 2,600 $m^2/g$. The NGPs obtained with the presently invented process tend to contain a significant proportion of single-layer graphene (with a thickness of 0.34-0.4 nm) or graphene of few layers (<2 nm).

The resulting NGPs prepared according to the presently invented process, although having a minimal amount of oxygen-containing groups (hence, remain highly conducting), become soluble or dispersible in water and several other organic solvents, such as methanol, ethanol, acetone, NMP, and toluene. These NGPs can be further functionalized by carrying out an additional step of contacting the lightly oxidized NGP obtained in step (b) with a reactant such that a functional group is added to a surface or edge of the nano graphene platelet, wherein the functional group is selected from alkyl or aryl silane, alkyl or aralkyl group, hydroxyl group, amine group, fluorocarbon, or a combination thereof.

As indicated earlier, for practical purposes (e.g., for the purpose of facilitating discussion), the nano GO platelets that contain less than approximately 15% by weight of oxygen (hence, the electrical conductivity of a thin film made from these platelets is typically greater than 10 S/cm) are considered nano graphene platelets (NGPs).

The presently invented process is superior to many prior art processes (e.g., those belonging to the aforementioned Approach 1 and Approach 2) in several aspects:

(1) For instance, as discussed earlier, Aksay, McAllister, and co-workers [Refs. 7-9, 66] used thermal exfoliation of GO to obtain exfoliated graphite oxide platelets. The process involved essentially an exfoliation step (e.g., at 1,050° C. for 30 seconds or in a propane torch for less than 15 seconds). Such a heat exposure typically produces graphite oxide platelets (rather than nano graphene) that, albeit dispersible, are typically not electrically conducting. Furthermore, this prior art process did not have a good control over the oxygen content of the resulting GO platelets.

(2) In another commonly used prior art approach, as practiced by Stankovich et al. [45] and Hirata et al. [17-19], graphite was heavily oxidized to obtain graphite oxide, which was then mixed with water. The resulting suspension was then subjected to ultrasonication for an extended period of time to produce colloidal dispersions of GO platelets. The graphite oxide dispersion was then reduced with hydrazine, in the presence of poly(sodium 4-styrenesulfonate). This process led to the formation of a stable aqueous dispersion of polymer-coated graphene platelets. In some applications, a polymer coating may be undesirable (pure graphene being preferred). Furthermore, the reducing agent, hydrazine, is a toxic substance.

(3) Stankovich et al. [46] further developed a method to produce less hydrophilic GO platelets using an isocyanate treatment. However, unless stabilized by selected polymers, the chemically modified graphene sheets obtained through these methods tend to precipitate as irreversible agglomerates due to their hydrophobic nature. The resulting agglomerates became insoluble in water and organic solvents. By contrast, the presently invented process provides a convenient approach to the preparation of soluble or dispersible nano graphene that requires only slight oxidation.

(4) Becerril, et al [67] and Wang, et al. [68] independently developed a very similar process for producing transparent, yet conducting electrode. The electrode was made by following a very tedious process that involves oxidation of natural graphite to form GO, repeated washing, ultrasonication, and 15 cycles of impurity removal steps that include centrifugation, discarding supernatant liquid, and re-suspending the solid in an aqueous mixture of sulfuric acid and hydrogen peroxide [67]. The suspension was eventually spin-coated on a solid substrate to form a GO thin film, which was then partially reduced by heating the film in a high vacuum at a high temperature for a long period of time. Such a long process does not appear to be amenable to mass production of conducting nano graphene platelets. It may be noted that both Becerril, et al [67] and Wang, et al. [68], did subject the GO films to a high temperature treatment after the tedious solution process for producing GO nano sheets and obtained electrical conductivity as high as 550 S/cm. However, once such a high temperature treatment was done, the GO nano sheets were no longer dispersible in water.

(5) Another unexpected benefit of the presently invented process is the observation that pristine NGPs remain relatively defect-free on the basal plane (graphene plane). In contrast, the heavily oxidized GO platelets are typically highly defected and could not fully recover the perfect graphene structure even after chemical reduction. Therefore, the resulting platelets exhibit a conductivity lower than that of a more perfect NGP obtained from oxidation of a pristine NGP material.

DETAILED DESCRIPTION OF PREFERRED EMBODIMENTS

Figure 1:
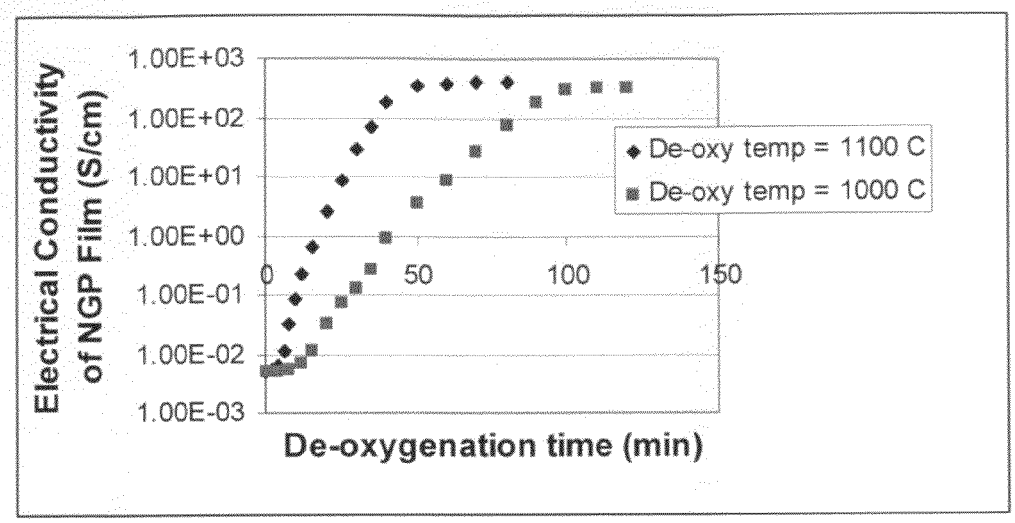
FIG. 1 Electrical conductivity data of the thin films made from GO nano platelets after various periods of de-oxygenation time at 1,000° C. and 1,100° C., respectively.

The present invention provides a process for producing soluble or dispersible nano graphene platelet (NGP) materials that are highly conducting. The electrical conductivity of NGPs in the present context was measured after the NGPs were formed into a thin film approximately 100 nm in thickness. The process comprises: (a) preparing a pristine NGP material from a graphitic material; and (b) subjecting the pristine NGP material to an oxidation treatment to obtain the dispersible NGP material, wherein the NGP material has an oxygen content no greater than 25% by weight. Preferably, the NGP material has an oxygen content no less than 5% by weight. A particularly useful oxygen content range is from approximately 10% to 20% by weight inclusive.

Preparation of Pristine NGPs

The pristine NGP material is preferably produced by a process comprising a procedure selected from: (A) intercalating the graphitic material with a non-oxidizing agent, followed by a thermal or chemical exfoliation treatment in a non-oxidizing environment; (B) subjecting the graphitic material to a supercritical fluid environment for inter-graphene layer penetration and exfoliation; or (C) dispersing the graphitic material in a powder form to an aqueous solution containing a surfactant or dispersing agent to obtain a suspension and subjecting said suspension to direct ultrasonication. Any one of these three procedures will lead to the production of pristine or un-oxidized NGPs. Preferred modes of practicing these three procedures are discussed in more detail as follows:

Procedure (A):

In Procedure (A), a particularly preferred step comprises (i) intercalating the graphitic material with a non-oxidizing agent, selected from an alkali metal (e.g., potassium, sodium, lithium, or cesium), alkaline metal, or an alloy, mixture, or eutectic of an alkali or alkaline earth metal; and (ii) a chemical exfoliation treatment (e.g., by immersing K-intercalated graphite in ethanol solution).

In addition to alkali metals (e.g. Li, Na, K, Rb, Cs) and alkaline earth metals (e.g. Mg, Ca, Sr, Ba), elements such as Eu, Yb, Ti, and halogen (Cl, F, I, etc.) can be used to intercalate the starting graphitic material. Intercalation of these elements can be carried out by several different routes. First, these elements can be intercalated electrochemically using a non-aqueous solvent. Second, an alkali plus naphthalene or benzophenone can be used with a suitable non-aqueous solvent (e.g., tetrahydrofuran). Third, any of the aforementioned metals can be intercalated by dissolving in a liquid ammonia solution to create solvated ions. Fourth, lithium can be intercalated by using n-butyl lithium in a hydrocarbon solvent (e.g., hexane). Fifth, element, such as K, or an eutectic of K, can be heated above its melting or eutectic point, enabling the melt to intercalate into inter-graphene spaces. Six, the graphitic material can be exposed to a halogen element or halogen compound sealed in a vessel or a two-chamber vessel (one chamber containing the graphitic material in a fine powder form and the other containing the halogen). The first five approaches were mentioned in Mack, et al. [51,52].

For instance, natural flake graphite can be heated to 200° C. in an evacuated container in the presence of potassium to form a first stage intercalation compound. By immersing this intercalation compound in ethanol, graphite is exfoliated with resulting graphene sheets dispersed in ethanol. Lithium can be intercalated at higher temperatures and/or pressures. Intercalation using the alkaline earth (Ca, Ba, Sr) or lanthanide metals (Eu, Yb, Sm, Tm) also requires high temperatures and long reaction times. Any solvent that contains water can be used for exfoliation, including organic solvents that have not been thoroughly dried. This includes water, alcohols, or other hydroxylic solvents (including carboxylic acids), or any combination thereof. Although Mack, et al. [51,52] prepared NGPs using the alkali metal intercalation approach, they did not teach about modifying NGPs for solubility, nor did they measure the electrical conductivity of NGPs.

Procedure (B):

Procedure (B) involves delaminating a graphitic material with a supercritical fluid or, analogous to a prior art approach, with a coating agent solubilized in a supercritical fluid. It is known that, if a substance is heated above its critical temperature (Tc) and pressurized above its critical pressure (Pc), it becomes a supercritical fluid. Supercritical fluids are known to provide favorable means to achieve solvating properties, which have both gas and liquid characteristics without actually changing a chemical structure. By proper control of pressure and temperature, a significant range of physico-chemical properties (density, diffusivity, dielectric constants, viscosity, and surface free energy) can be accessed without passing through a phase boundary, e.g., changing from gas to liquid form.

As an example, carbon dioxide may exist as a supercritical fluid having properties of both a liquid and a gas when above its critical temperature (>31° C.) and critical pressure (>7.4 MPa). Carbon dioxide under supercritical conditions exhibits both a gaseous property, being able to penetrate through many materials and a liquid property, being able to dissolve materials into their components. Although carbon dioxide is a preferred medium, the supercritical fluid may be selected from other suitable species, such as water, hydrogen peroxide, ozone, water oxidation, methane, ethane, ethylene, or a mixture thereof.

A conventional approach is herein discussed first, which can be used to prepare non-oxidized NGPs. This will be followed by a discussion on an innovative method developed in our research laboratory. The pristine NGPs prepared will then be subjected to a controlled oxidation treatment to produce dispersible or soluble NGPs that remain highly conductive. As suggested by Gulari, et al. [77], one may choose to use a coating agent that can be solubilized in the supercritical fluid to diffuse between the graphite layers. The purpose of this coating agent, according to Gulari, et al. [77], was to allow the coating agent to expand or swell the interstitial spaces between graphene layers (to assist in intercalation and exfoliation) and, after de-pressurization, the coating agent will precipitate out to surround and isolate the exfoliated graphene platelets. This coating agent (e.g., a polymer) will eventually become a part (the matrix) of a composite material. Generally, the coating agent may include a polymer, oligomer, monomer, or oil. In one embodiment, the coating agent is poly-(dimethyl siloxane) ("PDMS") having a weight average molecular weight of preferably between about 30,000 and 200,000 g/mole. Other suitable coating agents include poly-(tetrafluoroethylene-co-hexafluoropropylene), poly-(perfluoro-propylene oxide), poly-(diethyl-siloxane), poly-(dimethylsilicone), poly-(phenylmethylsilicone), perfluoroalkylpolyethers, chlorotrifluoroethylene, and bromotrifluoroethylene.

The graphitic material particles and the coating agent are preferably placed in a compartment of a high pressure vessel isolatable from the atmosphere. In this embodiment, the graphite particles comprise about 23 to 83 weight percent and the coating agent comprises about 77 to 17 weight percent of material placed in the vessel. The weight ratio of graphite particles to coating agent is preferably at least about 1:10. Then, the compartment is sealed off from the atmosphere. The compartment may be isolated by any conventional means. This is followed by introducing high-pressure carbon dioxide into the compartment with $CO_2$ being pressurized in the vessel to preferably above approximately 1,070 to 10,000 psig (7.4 MPa to 69 MPa). Then, the vessel is heated to a temperature preferably above about 40° C., and preferably above 70° C. These conditions define a supercritical condition of carbon dioxide whereby the coating agent is solubilized in the supercritical carbon dioxide. Pressurizing and heating the graphitic particles with the supercritical fluid may be accomplished by any conventional means. For instance, the vessel may be heated by a heating jacket or electrical heating tape disposed around the vessel.

With the coating agent being solubilized in the supercritical fluid, the coating agent diffuses into inter-graphene spaces to possibly expand or swell these spaces. The step of diffusing the coating agent between the graphene layers includes maintaining diffusion for between about 10 minutes to 24 hours (preferably 3 hours) at supercritical conditions to produce tentatively intercalated graphite.

The procedure further comprises catastrophically depressurizing the tentatively intercalated graphite to precipitate the coating agent from the supercritical fluid. During catastrophic depressurization, the supercritical fluid expands and exfoliates the graphite layers while the coating agent precipitates from the supercritical fluid to cover the layers. The depressurization step comprises immediately depressurizing the vessel down to a considerably lower pressure, preferably ambient pressure. This may be accomplished in a time period of between about 5 and 30 seconds, and preferably 15 seconds. This is accomplished by depressurizing the pressure vessel at a rate of between about 0.1 and 5.0 milliliters per second, and preferably 3.0 milliliters per second. The pressure decrease may be accomplished by opening the compartment to the atmosphere. As immediate depressurization occurs, the graphite layers are delaminated apart from one another other.

Presumably, the low viscosity and high diffusivity of the supercritical fluid allows the coating agent solubilized therein to become disposed or intercalated between the graphene layers in the graphitic material under supercritical conditions, thereby increasing the interlayer spacing. Upon depressurization, the supercritical fluid disposed in the interstitial spaces force the layers to exfoliate or delaminate from each other, and the coating agent previously solubilized in the supercritical fluid precipitates therefrom to deposit on the delaminated layers, preventing reformation of the van der Waals forces between graphene layers. That is, the coating agent precipitates from the supercritical fluid and attaches to the graphene layers.

Although this conventional route is useful in terms of producing pristine NGPs that are covered with a coating agent, one has to remove this coating agent unless the coating agent is desired for an intended application (e.g., for the preparation of a polymer matrix composite with the coating agent being the monomer or polymer for this matrix). After an extensive study, we have surprisingly observed that:

(1) Supercritical fluids containing no coating agent are at least as effective as those containing a coating agent for intercalating and exfoliating natural graphite. There is no major difference in the supercritical fluid temperature, pressure, time, and de-pressurization conditions between the two species (one with and the other without a coating agent);

(2) Supercritical fluids, with or without a coating agent therein, are effective in intercalating and exfoliating a wide variety of graphitic materials, including (in addition to natural graphite) artificial graphite (e.g., highly oriented pyrolytic graphite, HOPG), graphite oxide, graphite fluoride, graphite fiber, carbon fiber, carbon nano-fiber, carbon nano-tube, mesophase carbon microbead (MCMB), graphitized soft carbon, and hard carbon. Previous studies on supercritical fluid delamination of graphite have been essentially limited to chemically pre-intercalated natural graphite [Ref. 76] and natural flake graphite [Ref. 77].

(3) With proper conditions for supercritical fluid intercalation and exfoliation via de-pressurization, one could readily obtain ultra-thin NGPs with a thickness less than 1 nm. With other less favorable conditions (e.g., a slower depressurization rate), somewhat thicker NGPs were obtained. However, these thicker NGPs could be subjected to another cycle of supercritical fluid intercalation and exfoliation, preferably in the same pressure chamber, to yield much thinner NGPs. By repeating the process one or two times we could readily obtain substantially single-layer NGPs.

Procedure (C):

Another alternative procedure for exfoliating a graphitic material to produce pristine NGPs comprises (a) dispersing graphitic material particles in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce the separated nano-scaled platelets.

Preferably, the ultrasonication step is conducted at a temperature lower than 100° C. The energy level is typically greater than 80 watts. The liquid medium may comprise water, organic solvent, alcohol, a monomer, an oligomer, or a resin. The graphitic material could be natural graphite, synthetic graphite, highly oriented pyrolytic graphite, graphite oxide, graphite fiber, graphite nano-fiber, MCMB, soft carbon, hard carbon, or a combination thereof.

It may be noted that ultrasonication has been used to successfully separate graphite flakes after thermal exfoliation of chemically intercalated graphite. Examples are given in Sakawaki, et al. ("Foliated Fine Graphite Particles and Method for Preparing Same," U.S. Pat. No. 5,330,680, Jul. 19, 1994) and Chen, et al. ("Preparation and Characterization of Graphite Nanosheets from Ultrasonic Powdering Technique," Carbon, Vol. 42, 2004, 753-759). However, there has been no report on the utilization of ultrasonic waves in directly exfoliating graphite or graphite oxide (with or without intercalation) and, concurrently, separating exfoliated particles into isolated or separated graphite flakes or platelets with a thickness less than 100 nm. This direct graphite exfoliation procedure was discussed in detail in one of our earlier inventions [Ref. 75].

Controlled Oxidation of Pristine NGPs

In one preferred embodiment of the present invention, the second step of the process involves subjecting the pristine NGPs to a controlled oxidation treatment. As opposed to the original chemical intercalation/oxidation treatment required in the prior art preparation of graphite oxide nano platelets that involves heavy and essentially un-controlled oxidation of natural graphite, the present oxidation procedure for pristine NGPs has the following advantages: (1) Oxidation can be executed in a well-controlled manner; (2) The degree of oxidation can be relatively low (in such a manner that oxidation can be limited to the edge of NGPs, with the graphene plane surface remaining substantially oxygen-free, if so desired); (3) The oxidation procedure can proceed at a high rate since the original graphitic material has been split into smaller particles and, hence, the oxidizing agent does not have to travel through inter-particle regions; and (4) Due to the well-split and separated nature of NGPs, they can be subjected to gaseous phase oxidation, as opposed to liquid phase oxidation that requires a post-oxidation cleaning or purification procedure, which is typically very tedious and generates a great amount of waste water.

In one procedure, pristine NGPs may be dispersed in an acid (e.g., sulfuric acid, nitric acid, carboxylic acid, acetic acid, formic acid, etc.) and/or an oxidizing agent (e.g., $KMnO_4$, sodium or potassium chlorate, and hydrogen peroxide, $H_2O_2$) at a temperature for a desired period of time. More environmentally benign acids or oxidizers, such as carboxylic acid, acetic acid, formic acid, and hydrogen peroxide, are preferred. The carboxylic acid may be selected from the group consisting of aromatic carboxylic acid, aliphatic or cyclo-aliphatic carboxylic acid, straight chain or branched chain carboxylic acid, saturated and unsaturated mono-carboxylic acids, di-carboxylic acids and poly-carboxylic acids that have 1-10 carbon atoms, alkyl esters thereof, and combinations thereof.

Alternatively and preferably, the oxidation treatment comprises subjecting the pristine NGPs to an oxidizing agent in a vaporous or gaseous state. This oxidizing agent is preferably selected from ozone, sulfonic ($SO_3$) vapor, an oxygen-containing gas, hydrogen peroxide vapor, nitric acid vapor, or a combination thereof. Further preferably, the treatment comprises subjecting the pristine NGP material to an oxidizing agent in a hydrogen-containing environment. Hydrogen seems to provide useful functional groups, such as carboxyl and hydroxyl. Although oxidation treatment can be conducted by immersing NGPs in a liquid acid and/or oxidizer environment, such a procedure requires a subsequent water-rinsing and purification step (such a rinsing procedure is not as tedious as required in the case of conventional sulfuric acid-intercalation graphite, nevertheless). Hence, a gaseous treatment requiring no post-treatment rinsing is preferred.

A primary goal of the oxidation treatment is to impart solubility or dispersibility to the pristine NGPs without a significant compromise in electrical conductivity. After an extensive and in-depth study we have discovered that dispersible and conductive NGPs can be achieved by producing pristine NGPs first and then imparting to pristine NGPs an oxygen content up to 25% by weight, preferably below 20% by weight, further preferably between 5% and 20% by weight. The oxygen content can be determined using chemical elemental analysis and/or X-ray photoelectron spectroscopy (XPS).

It has been hitherto commonly believed by those skilled in the art that chemical processibility and electrical conductivity of graphite materials are mutually exclusive. Quite opposite to this common wisdom, we have herein proven that, within a reasonable range of oxygen contents in NGPs and their associated window of processing conditions, these two features can be achieved at the same time. The good solubility or dispersibility enables the production of NGP-based products, such as graphene paper, film, and nanocomposite structures, that have desirable physical properties. The oxygen content, along with some hydrogen, also enables us to impart a wide variety of functional groups to the NGPs.

The laminar graphite materials used in the prior art processes for the production of the GIC, GO, and subsequently made exfoliated graphite, flexible graphite sheets, and graphene platelets were, in most cases, natural graphite. However, the present invention is not limited to natural graphite. The starting material may be selected from the group consisting of natural graphite, artificial graphite (e.g., highly oriented pyrolytic graphite, HOPG), graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

The presently invented process typically resulted in a dispersible nano graphene platelet material, when formed into a thin film with a thickness no greater than 100 nm, exhibits an electrical conductivity of at least 10 S/cm, often higher than 100 S/cm, and, in many cases, higher than 1,000 S/cm. The resulting NGP material typically has a specific surface area of from approximately 300 $m^2/g$ to 2,600 $m^2/g$ and, in many cases, comprises single-layer graphene sheets.

The process may further comprise a step of contacting the nano graphene platelet material, during and/or after oxidation, with a reactant such that a functional group is added to a surface or edge of the nano graphene platelet material. Theses functional groups may contain alkyl or aryl silane, alkyl or aralkyl group, hydroxyl group, carboxyl group, amine group, sulfonate group ($—SO_3H$), aldehydic group, quinoidal, fluorocarbon, or a combination thereof.

The following examples serve to provide the best modes of practice for the present invention and should not be construed as limiting the scope of the invention.

Examples 1-4 provide baseline or control samples, based on the preparation of graphite oxide (GO) and then de-oxygenation of GO nano platelets. Subsequent examples provide samples that are prepared according to a preferred embodiment of the present invention-preparation of pristine NGPs, followed by partial oxidation.

EXAMPLE 1

NGPs From Carbon/Graphite Fibers

Continuous graphite fiber yarns (Magnamite from Hercules) were cut into segments of 5 mm long and then ball-milled for 24 hours. Approximately 20 grams of these milled fibers were immersed in a mixture of 2 L of formic acid and 0.1 L of hydrogen peroxide at 45° C. for 48 hours. Following the chemical oxidation intercalation treatment, the resulting intercalated fibers were washed with water and dried. The resulting product is a formic acid-intercalated graphite fiber material containing graphite oxide crystallites.

Subsequently, approximately ½ of the intercalated or oxidized fiber sample was transferred to a furnace pre-set at a temperature of 600° C. for 30 seconds. The compound was found to induce extremely rapid and high expansions of graphite crystallites. The as-exfoliated graphite fiber is designated as Sample-1a. Approximately half of Sample 1-a material was subjected to de-oxygenation at 1,100° C. for 20 minutes in a nitrogen atmosphere to obtain Sample-1b.

A small amount of both materials was mixed with an aqueous ethanol solution to form two separate suspensions, which were subjected to further separation of exfoliated flakes using a Cowles shearing device. Both graphite oxide platelets (Sample 1-a) and reduced GO platelets (essentially NGPs) were found to be soluble and well-dispersed in this aqueous solution. The resulting suspensions were dip-coated to form thin films with a thickness of approximately 100 nm on glass slide surfaces. The thickness of individual platelets was found to range from two graphene sheets to approximately 25 graphene sheets (average of 14 sheets or approximately 4.7 nm) based on SEM and TEM observations. The length of these NGPs was typically in the range of 10-60 μm and width in the range of 0.5-2 μm.

A four-point probe method was used to measure the electrical conductivity of the thin films on the glass substrate. It was found that the conductivity of the film prepared from Sample 1-a (as-exfoliated GO platelets) was approximately $1.3 \times 10^{-3}$ S/cm while that of Sample 1-b was 2.8 S/cm.

EXAMPLE 2

NGPs From Sulfuric Acid Intercalation and Exfoliation/De-Oxygenation of MCMBs

MCMB 2528 microbeads were supplied by Alumina Trading, which is the U.S. distributor for the supplier, Osaka Gas Chemical Company of Japan. This material has a density of about 2.24 g/cm$^3$; a particle size maximum for at least 95% by weight of the particles of 37 microns; median size of about 22.5 microns and an inter-planar distance of about 0.336 nm. MCMB 2528 (10 grams) were intercalated with an acid solution (sulfuric acid, nitric acid, and potassium permanganate at a ratio of 4:1:0.05) for 24 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was spray-dried and stored in a vacuum oven at 60° C. for 24 hours. The dried powder sample was placed in a quartz tube and inserted into a horizontal tube furnace pre-set at a desired temperature, 600° C. for 30 seconds to obtain Sample 2-a. Approximately one half of the exfoliated MCMB sample was subjected to de-oxygenation treatment at 1,250° C. for 15 minutes in an argon environment to obtain Sample 2-b. A small quantity of each sample was mixed with water and ultrasonicated at a 60 W power for 10 minutes to obtain a suspension. Again, thin films were prepared from each suspension by dip coating and the electrical conductivity of the films was measured. The conductivity of the film prepared from Sample 2-a (as-exfoliated oxidized MCMB platelets) was found to be approximately $1.8 \times 10^{-2}$ S/cm and that of Sample 2-b after de-oxygenation was 67 S/cm. Both types of platelets were well-dispersed in water.

EXAMPLE 3

Oxidation, Exfoliation, and De-Oxygenation of Natural Graphite

Graphite oxide was prepared by oxidation of graphite flakes with sulfuric acid, sodium nitrate, and potassium permanganate at a ratio of 4:1:0.05 at 30° C. for 24 hours, according to the method of Hummers [U.S. Pat. No. 2,798, 878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 7. The intent was to remove all sulfuric and nitric acid residue out of graphite interstices. The slurry was spray-dried and stored in a vacuum oven at 60° C. for 24 hours. The interlayer spacing of the resulting laminar graphite oxide was determined by the Debey-Scherrer X-ray technique to be approximately 0.73 nm (7.3 Å), indicating that graphite has been converted into graphite oxide.

The dried, intercalated (oxidized) compound was divided into two batches, both for exfoliation at 800° C. for 1 minute by placing the sample in a quartz tube that was inserted into a horizontal tube furnace pre-set at 800° C. For Sample 3-a, exfoliation was followed by de-oxygenation at 1,000° C. for various periods of time, from 1 minute to 120 minutes. For Sample 3-b, the de-oxygenation temperature was 1,100° C., from 1 minute to 80 minutes. The de-oxygenation atmosphere was approximately 95% nitrogen and 5% hydrogen.

Two series of thin films were prepared from these two samples for the purpose of measuring the electrical conductivity of the GO nano platelets or NGPs as a function of the de-oxygenation time and the resulting oxygen content. The oxygen content, based on the elemental analysis, was for those oxygen atoms in functional groups attached to the plane surfaces and edges of the platelets. The exfoliated and de-oxygenated products, after various periods of de-oxygenation, were each mixed with water and then subjected to a mechanical shearing treatment using a Cowles rotating-blade shearing machine for 20 minutes. The resulting platelets were found to have an average thickness of 6.3 nm. Spin coating was used to prepare thin films for conductivity measurement. GO or graphene platelets at selected de-oxygenation time intervals were also analyzed for their oxygen contents using X-ray photoelectron spectroscopy (XPS) available at the Center for Multifunctional Nonmaterial at Wright State University, Dayton, Ohio.

Shown in FIG. 1 is a summary of the electrical conductivity data of the films made from GO nano platelets after various periods of de-oxygenation time at 1,000° C. and 1,100° C., respectively. The conductivity of the film varies from $5.0 \times 10^{-3}$ S/cm of as-foliated GO to 180 S/cm after 40 minutes of de-oxygenation, and to $4.1 \times 10^2$ S/cm after 80 minutes, the latter representing a five order-of-magnitude improvement in electrical conductivity. The GO or de-oxygenated GO platelets were found to be soluble or dispersible in water up to an oxygen content of 5.6% by weight (after 50 minutes at 1,100° C., giving rise to an electrical conductivity of 360 S/cm). This conductivity value is a very impressive result, comparable to the best achievable conductivity with strong or heavy chemical reduction and/or vacuum de-oxygenation treatments after the films were made (yet those graphene platelets of the thin films prepared in the prior art became non-dispersible) [Refs. 47,67,68].

The two curves and the observations made on the solution dispersibility of the corresponding suspensions appear to indicate that the conductivity increases rapidly with the degree of de-oxygenation while the GO platelets remain soluble over a range of treatment time durations at a given de-oxygenation temperature; e.g., up to 50 minutes at 1,100° C. Once the conductivity value reaches a plateau, the platelets begin to lose their solubility or dispersibility in water and other polar solvents, such as ethanol and acetone. Fortunately, this plateau value is already very high, typically in the range of 100-1,000 S/cm.

Figure 2:
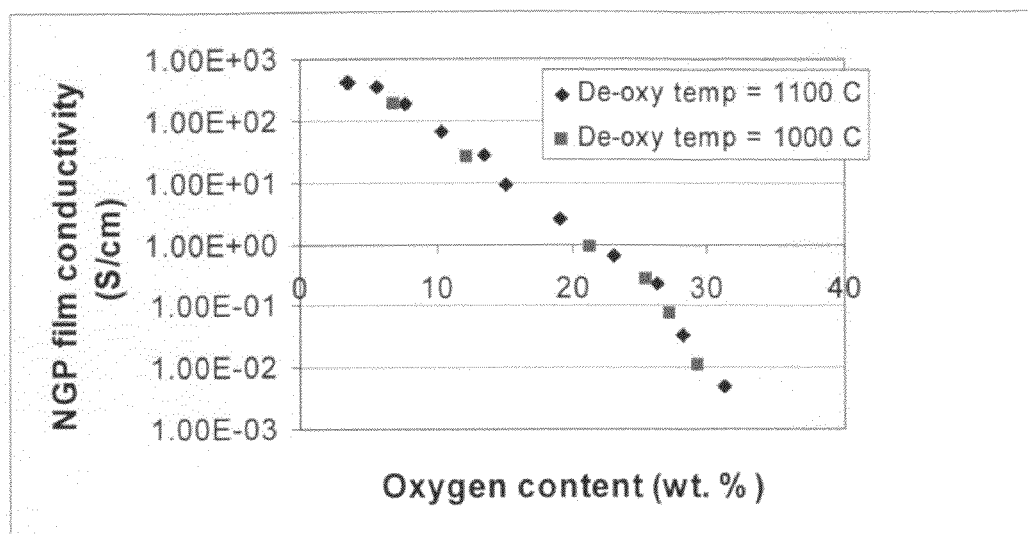
FIG. 2 Electrical conductivity data plotted as a function of the corresponding oxygen content in GO nano platelets prepared at two de-oxygenation temperatures.

The electrical conductivity data were plotted as a function of the corresponding oxygen content data for two de-oxygenation temperatures, as shown in FIG. 2. It is clear that, regardless of the de-oxygenation temperature, it is the final oxygen content that governs the conductivity of GO or reduced GO platelets; the lower the oxygen content, the higher the conductivity is. When the oxygen content is below 5% by weight, the reduced GO tends to become insoluble or non-dispersible in water. Surprisingly, and fortunately, within the oxygen content range of 5%-20%, the nano platelet film exhibits a conductivity value greater than 1 S/cm. If the oxygen content is below 15%, the conductivity is greater than 10 S/cm. The conductivity of the NGP film is greater than 100 S/cm if the oxygen content is below 10%.

EXAMPLE 4

Figure 3:
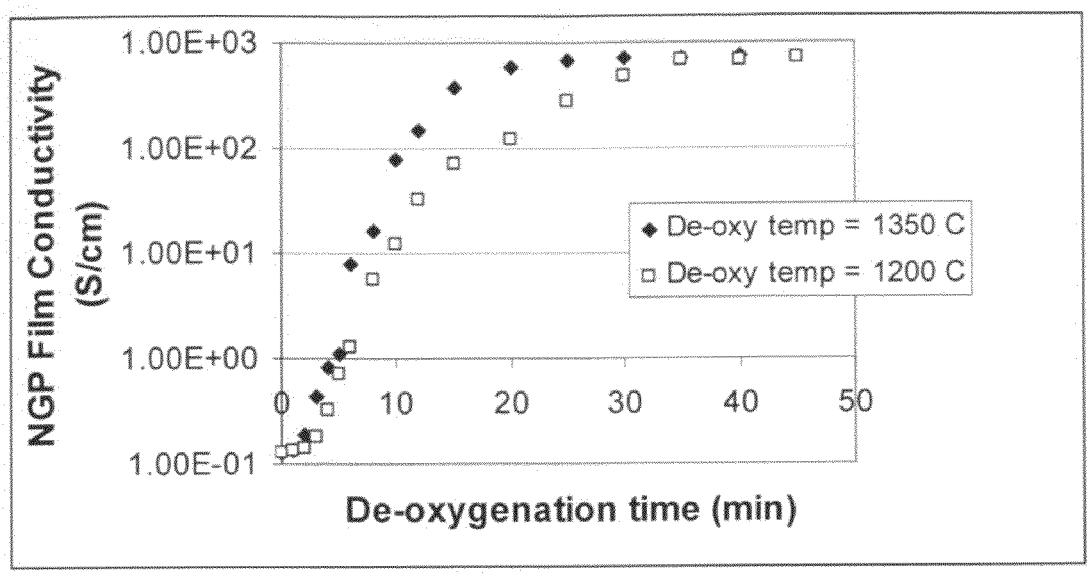
FIG. 3 Electrical conductivity data of GO nano platelet films after various periods of platelet de-oxygenation time at 1,200° C. and 1,350° C.

Oxidation, Exfoliation, De-Oxygenation, and Further Functionalization of Natural Graphite The samples of Example 4, including Sample 4-a and 4-b, were prepared in a similar manner as described in Example 3, but the exfoliation was conducted at 1,000° C. for 45 seconds, followed by de-oxygenation at 1,200° C. and 1,350° C., respectively, for various periods of time. Shown in FIG. 3 is a summary of the electrical conductivity data of the films made from GO nano platelets after various periods of de-oxygenation time. These data further confirm the trend observed earlier that the electrical conductivity of nano graphene or graphene oxide films increases with increasing de-oxygenation time (or decreasing oxygen content). High conductivity can be attained with shorter periods of time if the de-oxygenation temperature is sufficiently high.

In order to determine if a lower oxygen content would adversely affect the functionalization capability of graphene platelets and how functionalization would impact the electrical conductivity of these platelets, we carried out additional work on selected samples, described below: With the de-oxygenation atmosphere containing some hydrogen, we presumed that the edges of graphene or graphene oxide platelets contained a significant amount of activated C—H bonds. We chose to sulfonate the two samples that had been de-oxygenated for 10 minutes and 45 minutes, respectively, at 1,200° C. The sample with a 10-min de-oxygenation treatment (Sample 4-a-10) was highly soluble in water, but that with a 45-minute treatment (Sample 4-a-45) has poor or limited solubility in water. Sulfonation was conducted by subjecting the two samples to the vapor phase of a fuming sulfuric acid (oleum) containing 20% $SO_3$ for one hour. The results were very surprising. After the sulfonation treatment, Sample 4-a-10 remained highly soluble in water and Sample 4-a-45, originally having limited solubility, became soluble in water. Most surprisingly, the electrical conductivity of their respective films remained essentially un-changed, 12 S/cm and 695 S/cm, respectively. This important observation suggests that further functionalization of de-oxygenated graphene platelets provides another tool of varying solubility of the graphene platelets, as prepared by the presently invented de-oxygenation process, without adversely affecting their conductivity.

Sulfonation is but one of many approaches to the functionalization of de-oxygenated GO platelets. Presumably, both the functional groups attached to basal plane atoms and those at the edges of basal planes (or graphene planes) tend to decrease the electrical conductivity of a graphene or graphene oxide platelet. The surface functional groups are in the way of electron conduction paths and, hence, are much more influential on the electron transport. These groups represent defects that could significantly reduce the mean free path of electrons moving on a basal plane. The functional groups at the graphene edge, although altering the quantum wave functions of electrons at the edge, would have less significant effect on the overall conductivity. However, the presence of different functional groups could have significantly different effects on solubility or dispersibility of a graphene or graphene oxide platelet in a solvent and the interfacial bonding between a platelet and a matrix material in a nanocomposite. This implies that we now have a tool of adjusting the solubility or dispersibility of NGPs in a solvent without significantly varying the electrical conductivity.

EXAMPLE 5

Preparation of Pristine NGPs from Natural Flake Graphite and Graphite Fibers Using Direct Ultrasonication Five grams of graphite flakes, ground to approximately 20 µm or less in sizes, were dispersed in 1,000 mL of deionized water (containing 0.1% by weight of a dispersing agent, Zonyl® FSO from DuPont) to obtain a suspension. An ultrasonic energy level of 75 W (Branson S450 Ultrasonicator) was used for exfoliation, separation, and size reduction for a period of 1 hour. This procedure was repeated several times, each time with five grams of starting graphite powder, to produce a sufficient quantity of pristine NGPs, which are hereinafter referred to as Sample 5-p-U (p stands for pristine and U stands for ultrasonic).

The same procedure was repeated for graphite fibers to obtain Sample 5Gf-p-U. The graphite fibers used were the same as those in Example 1.

EXAMPLE 6

Preparation of Pristine NGPs From Natural Graphite Flakes and MCMBs Using Potassium Intercalation Natural graphite was obtained from Huadong Graphite Co., Qingdao, China. The first stage intercalation compound, $KC_8$, was synthesized by adding a stoichiometric amount of potassium, 81.4 mg (0.0021 moles) to 200 mg (0.0167 moles) of graphite particles in a Pyrex tube capped with a stopcock. All transfers were carried out in a helium filled dry box. The reactant filled tube was evacuated, sealed and heated for 16 hours at 200° C. The compound formed was bright gold in color. The obtained GIC was poured into a mixture of ethanol and distilled water (50:50 by volume). The material turns from gold to black as the graphite got exfoliated and bubbling was observed, suggesting that hydrogen was produced. The resulting solution was basic due to the formation of potassium ethoxide. The dispersion of nano graphene sheets in aqueous ethanol solution was then allowed to settle. The solvent was decanted and the product washed several times with ethanol until a neutral pH was obtained. This pristine NGP material is referred to as Sample 6-p-K (K stands for potassium intercalation).

Another batch of samples was prepared from MCMBs following the same procedures. This pristine NGP material is referred to as Sample 6MC-p-K.

EXAMPLE 7

Preparation of Pristine NGPs Using Supercritical Fluids

A natural graphite sample (approximately 5 grams) was placed in a 100 milliliter high-pressure vessel. The vessel was equipped with security clamps and rings that enable isolation of the vessel interior from the atmosphere. The vessel was in fluid communication with high-pressure carbon dioxide by way of piping means and limited by valves. A heating jacket was disposed around the vessel to achieve and maintain the critical temperature of carbon dioxide.

High-pressure carbon dioxide was introduced into the vessel and maintained at approximately 1,100 psig (7.58 MPa).

Subsequently, the vessel was heated to about 70° C. at which the supercritical conditions of carbon dioxide were achieved and maintained for about 3 hours, allowing carbon dioxide to diffuse into inter-graphene spaces. Then, the vessel was immediately depressurized "catastrophically" at a rate of about 3 milliliters per second. This was accomplished by opening a connected blow-off valve of the vessel. As a result, delaminated or exfoliated graphene layers were formed, which were identified as Sample 7-p-SC-A. This sample was found to contain pristine NGPs with an average thickness just under 10 nm.

Approximately two-thirds of Sample 7-p-SC-A was removed from the pressure vessel. The remaining NGPs were subjected to another cycle of supercritical $CO_2$ intercalation and de-pressurization treatments (i.e., the above procedures were repeated), yielding much thinner NGPs with an average thickness of 2.1 nm (identified as Sample 7-p-SC-B). The specific surface area, as measured by the BET method, was approximately 430 $m^2/g$. TEM and AFM examinations indicated that there were many single-layer graphene sheets in this sample.

Sample 7-p-SC-C was prepared under essentially identical supercritical $CO_2$ conditions, with the exception that a small amount of surfactant (approximately 0.05 grams of Zonyl® FSO) was mixed with 5 grams of natural graphite before the mixture was sealed in the pressure vessel. The resulting NGPs have a surprisingly low average thickness, 3.1 nm. After the pressurization and de-pressurization procedures were repeated for one cycle, the resulting NGPs have an average thickness less than 1 nm, indicating that a majority of the NGPs are single-layer or double-layer sheets. The specific surface area of this sample after a repeated cycle was approximately 900 $m^2/g$. It may be noted that a sample of single-layer graphene sheets should exhibit a specific surface area of >2,670 m/g. It is clear that the presence of a surfactant or dispersing agent promotes separation of graphene layers, perhaps by preventing the reformation of van der Waals forces between graphene sheets once separated.

EXAMPLE 8

Controlled Oxidation of Pristine NGPs

The oxidation treatment of the samples prepared in Examples 5-7 was carried out in two different ways: one in a liquid state and the other in a vapor/gas state.

As one example for vapor phase oxidation, $SO_3$ vapor was generated by adding and heating 10 g of fuming sulfuric acid into a reactor The $SO_3$ vapor was passed through a column in which 10 g of pristine NGPs was packed for the oxidation treatment for various durations of time, from 5 minutes to one hour. Upon completion of the oxidation, the column containing oxidized NGPs was slightly heated at about 60° C. for about 15 minutes to remove excessive amount of $SO_3$ condensed on the surface of the NGPs, and the separated $SO_3$ was recovered and absorbed into the sulfuric acid in the reactor. $SO_3$-treated NGPs were washed with water and filtered.

Another example for vapor/gas phase oxidation entails simply exposing NGPs to a heated oxygen or oxygen-containing gas environment (e.g., oxygen gas with a small amount of water, 1% by weight). A suitable temperature range is 250-500° C. for 10 to 120 minutes. It may be noted that graphite oxidation was generally believed to occur only at a temperature higher than 350° C. However, much to our surprise, oxidation of graphene could occur at as low as 200° C. This perhaps is due to the nano-scaled nature of NGPs.

Liquid state oxidation of pristine NGPs can be carried out by simply immersing NGPs in a solution containing an acid and/or oxidizer. More benign acids, such as acetic acid and formic acid, are preferred although it takes a longer period of time to complete an oxidation procedure as compared with sulfuric or nitric acid. More benign oxidizers, such as $H_2O_2$, are preferred over other strong oxidizers, such as potassium permanganate. It was more difficult to wash and remove a salt like potassium permanganate from treated NGPs.

Oxidation conditions of a wide range of pristine NGPs are summarized in Table 1.

TABLE 1

Properties of partially oxidized NGPs.

| Pristine NGP Sample | Oxidation Conditions | Solubility or Dispersibility | Oxygen Contents (wt. %) |
| --- | --- | --- | --- |
| 5-p-U | $SO_3$ vapor at 80° C. for 5 to 60 minutes | Soluble in water or alcohol when O content >5% by wt | 3.5-18.5% |
| 5Gf-p-U | $SO_3$ vapor at 80° C. for 5 to 60 minutes | Soluble in water or alcohol when O content >5% by wt | 3.9-21.5% |
| 6-p-K | $O_2$ + 1% water vapor at 350° C. for 10-80 minutes | Soluble in water or alcohol when O content >5% by wt | 4.6-24.5% |
| 6MC-p-K | $O_2$ at 350° C. for 10-80 minutes | Soluble in NMP, toluene, acetone | 2.8-27% |
| 7-p-SC-A | Nitric acid at 45° C. for 5-80 minutes | Soluble in water or alcohol when O content >5% by wt | 5.2-34% |
| 7-p-SC-B | Formic acid at 45° C. for 15-120 minutes | Soluble in water or alcohol when O content >5% by wt | 3.8-28% |
| 7-p-SC-C | Aqueous $H_2O_2$ (30%) solution at 45° C. for 10-120 minutes | Soluble in NMP, toluene, acetone | 5.5-31.3% |

There are two significant observations that can be made from Table 1: (1) Typically, NGPs become soluble in polar solvents, such as water and alcohol, when the oxygen content exceeds 5% by weight; and (2) Some of the NGPs, after partial oxidation, actually become soluble in non-polar solvents, such as NMP and toluene, which is an un-expected result. This is surprising since a higher oxygen content means the presence of more polar groups, such as carboxyl and hydroxyl, that make the NGPs more polar.

Figure 4:
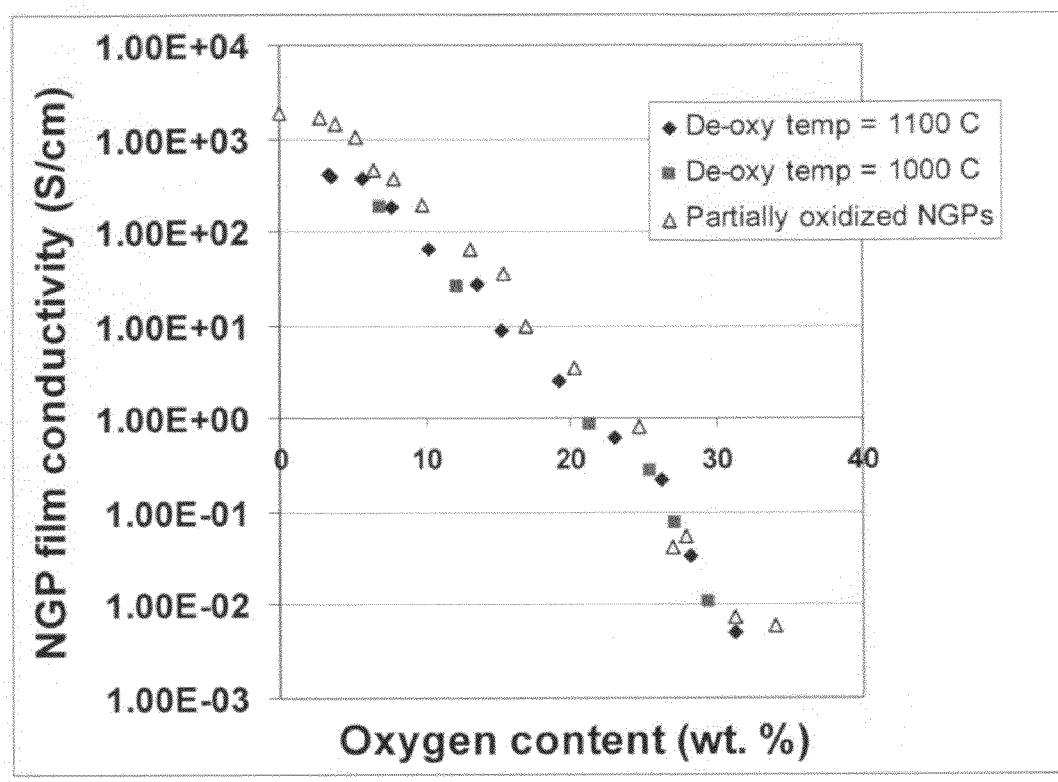
FIG. 4 Electrical conductivity data of pristine NGPs and their partially oxidized versions prepared according several preferred embodiments of the present invention. The data shown in FIG. 2 were herein repeated for the purpose of comparison.

Pristine and partially oxidized NGPs from selected samples (6MC-p-K, 7-p-SC-A, 7-p-SC-B, and 7-p-SC-C) were made into thin films (approximately 100 nm thick) for electrical conductivity measurements. The results are summarized in FIG. 4, along with the conductivity data of those NGPs or GO prepared from de-oxygenating heavily oxidized GO platelets. It is clear that the electrical conductivity of NGPs or GO nano platelets decreases with increasing oxygen content, regardless of the preparation routes.

For those samples prepared from oxidation of pristine NGPs, the conductivity is normally greater than 1 S/cm if the oxygen content is less than 25% by weight, similar to the case of partially de-oxygenated GN platelets. However, the electrical conductivity of those prepared by partially oxidizing pristine NGPs is almost always greater than that of those prepared by partially de-oxygenating GO nano platelets with a comparable oxygen content. This is another highly surprising result of the present study. We speculated that those heavily oxidized GO platelets were highly defected, likely with their graphene plane populated with oxygen-containing chemical groups. Even after partial de-oxygenation, these original chemical group sites remain as structural defects. By contrast, oxidation of pristine NGPs might begin with the graphene edges and chemical groups began to attach to the graphene surface only after the edges were fully oxidized.

EXAMPLE 9

Various Surface Functionalization Treatments of Partially Oxidized NGPs

The partially oxidized NGPs prepared according to a preferred embodiment of the present invention can be further functionalized by carrying out an additional step of contacting the partially oxidized NGPs with a reactant such that a functional group is added to a surface or edge of the nano graphene platelet. The functional group may be selected from, as examples, alkyl or aryl silane, alkyl or aralkyl group, hydroxyl group, amine group, fluorocarbon, or a combination thereof.

As an example, two separate batches of Sample 6-p-K were subjected to oxidation treatments to obtain Sample 6-p-K-4.6 (oxygen content of 4.6% by weight) and Sample 6-p-K-24.5 (oxygen content of 24.5% by weight). They were then allowed to undergo various functionalization treatments, briefly described as follows:

The NGPs, after a partial oxidation treatment, will have a reactive graphene surface (RGS) or reactive graphene edge (RGE). They were prescribed to undergo the following reactions:

(a) RGS/RGE+$CH_2$=CHCOX (at 1,000° C.)→Graphene-R'COH (where X=—OH, —Cl, —$NH_2$, or —H); e.g., RGS/RGE+$CH_2$=CHCOOH→G-R'CO—OH (where G=graphene);
(b) RGS/RGE+Maleic anhydride→G-R'$(COOH)_2$;
(c) RGS/RGE+Cyonogen→G-CN;
(d) RGS/RGE+$CH_2$=CH—$CH_2$X→G-R'$CH_2$X (where X=—OH, -halogen, or —$NH_2$);
(e) RGS/RGE+$H_2$O→G=O (Quinoidal);
(f) RGS/RGE+$CH_2$=CHCHO→G-R'CHO (Aldehydic);
(g) RGS/RGE+$CH_2$=CH—CN→G-R'CN;

In the above-listed reactions, R' is a hydrocarbon radical (alkyl, cycloalkyl, etc).

The results of electrical conductivity measurements of the NGP films and observations on solubility of NGPs in solvents are summarized in Table 2. These data further confirm that chemical functionalization treatments can be used to vary the solubility or dispersibility of NGPs without significantly compromising electrical conductivity.

TABLE 2

Conductivity and solubility of functionalized NGPs.

| Sample | Functionalization Treatment | Thin Film Electrical Conductivity (S/cm) | Solubility in a Solvent |
|---|---|---|---|
| 6-p-K-24.5 | None | 0.9 | Highly soluble in water, acetone, ethanol, etc. |
| 6-p-K-4.6 | None | 1,036 | Limited solubility in water, acetone, ethanol |
| 6-p-K-4.6 | Reaction (a), X = —OH | 988 | Became soluble in water and ethanol |
| 6-p-K-4.6 | Reaction (b) | 983 | Became soluble in water and ethanol |
| 6-p-K-24.5 | Reaction (c) | 0.8 | Highly soluble in water, acetone, ethanol, etc. |
| 6-p-K-4.6 | Reaction (d), X = —$NH_2$ | 985 | Became soluble in acetone |
| 6-p-K-24.5 | Reaction (e) | 1.1 | Highly soluble in water, acetone, ethanol, etc. |
| 6-p-K-24.5 | Reaction (e) | 1.0 | Highly soluble in water, acetone, ethanol, etc. |
| 6-p-K-24.5 | Reaction (f) | 0.9 | Highly soluble in water, acetone, ethanol, etc. |

EXAMPLE 10

Functionalization or Derivatization of Partially Oxidized NGPs

Partial oxidation of pristine NGPs can lead to the attachment of some functional groups on a surface or at an edge of a graphene plane, including carboxylic acid and hydroxyl groups. A large number of derivatives can be prepared from carboxylic acid alone. For instance, alcohols or amines can be easily linked to acid to provide stable esters or amides. If the alcohol or amine is part of a di- or poly-functional molecule, then linkage through the O— or NH— leaves the other functional group(s) as pendant group(s). For instance, we can have R—OH or R—$NH_2$, where R=alkyl, aralkyl, aryl, fluoroethanol, polymer, and $SiR'_3$. Examples include Cl—$SiR'_3$, HO—R—OH (R=alkyl, aralkyl, or $CH_2O$—), $H_2N$—R—$N_2H$ (R=alkyl, aralkyl), X—R—Y (R=alkyl, etc.; X=OH or $NH_2$; Y=SH, CN, C=O, CHO, alkene, alkyne, aromatic, or heterocycles).

As an example, Sample 6-p-K-24.5 was treated to undergo the following reactions: R—COOH+Im-CO-Im→R—CO-Im+Him+$CO_2$ (Im=imidazolide) and Him=imidazole), which was followed by R—CO-Im+R'OH (in NaOEt)→R—CO—OR'+HIm, and, separately for another specimen, by R—CO-Im+R'$NH_2$→R—CO—NHR'+Him.

In summary, the presently invented process is superior to many prior art processes in several aspects:

1) Prior art processes based on graphite intercalation/oxidation and high-temperature exfoliation did not allow for a good control over the oxygen content of the resulting GO or NGP platelets.

2) In another commonly used prior art approach, the graphite oxide dispersed in an aqueous solution was reduced with hydrazine, in the presence of a polymer, such as poly (sodium 4-styrenesulfonate). This process led to the formation of a stable aqueous dispersion of polymer-coated graphene platelets. In some applications of NGPs, however, a polymer coating may be undesirable. Furthermore, the reducing agent, hydrazine, is a toxic substance.

3) Another prior art method of producing less hydrophilic GO platelets involved using an isocyanate treatment. However, unless stabilized by selected polymers, the chemically modified graphene sheets obtained through this method tended to precipitate as irreversible agglomerates due to their hydrophobic nature. The resulting agglomerates became insoluble in water and organic solvents. By contrast, the presently invented process provides a simple and convenient approach to the preparation of soluble or dispersible nano graphene that is also highly conducting.

4) Conventional processes of preparing GO nano sheets that included chemical exfoliation typically were extremely tedious. Such a long process is not amenable to the mass production of conductive nano graphene platelets. In these prior art processes, by subjecting the GO films to a high temperature treatment in a vacuum, one could obtain nano platelets with thin film electrical conductivity as high as 550 S/cm. However, once such a high temperature treatment was done, the GO nano sheets were no longer dispersible in water.

5) The presently invented process is capable of producing NGPs with no or little impurity. The process can obviate the need for washing and rinsing the platelets (which was required in the prior art solution approach to the exfoliation of GO and/or subsequent chemical reduction).

6) The presently invented process allows for the NGPs to be readily or easily functionalized. This is particularly useful if NGPs are used as a filler in a composite material. Solubility or dispersibility of NGPs in a solvent allows mixing of these NGPs with a polymer that is also soluble in the same solvent.

7) The presently invented process enables us to have separate control over dispersibility and conductivity, which were considered mutually exclusive in the prior art.

The invention claimed is:

1. A process for producing a dispersible nano graphene platelet (NGP) material, said process comprising:
   (a) preparing a pristine NGP material from a graphitic material, wherein said pristine NGP material is obtained from a process comprising a procedure selected from:
      a. intercalating said graphitic material with a non-oxidizing agent, followed by a thermal or chemical exfoliation treatment in a non-oxidizing environment;
      b. subjecting said graphitic material to a supercritical fluid environment for inter-graphene layer penetration and exfoliation;
      c. dispersing said graphitic material in a powder form to an aqueous solution containing a surfactant or dispersing agent to obtain a suspension and subjecting said suspension to direct ultrasonication; or a combination thereof; and
   (b) subjecting said pristine NGP material to an oxidation treatment to obtain said dispersible NGP material, wherein said NGP material has an oxygen content in the range from approximately 5 to 25% by weight without any chemical reduction procedure.

2. The process as set forth in claim 1 wherein said dispersible NGP has an oxygen content in the range of approximately 5% to 20% by weight inclusive.

3. The process as set forth in claim 1 wherein said oxidation treatment comprises subjecting said pristine NGP material to an oxidizing agent selected from ozone, sulfonic vapor ($SO_3$), an oxygen-containing gas, hydrogen peroxide vapor, nitric acid vapor, or a combination thereof.

4. The process as set forth in claim 1 wherein said oxidation treatment comprises subjecting said pristine NGP material to an oxidizing agent in a hydrogen-containing environment.

5. The process as set forth in claim 1 wherein said graphitic material is selected from the group consisting of natural graphite, artificial graphite, graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof.

6. The process as set forth in claim 1 wherein said pristine NGP material is obtained from a process comprising dispersing said graphitic material in a powder form to an aqueous solution containing a surfactant or dispersing agent to obtain a suspension and subjecting said suspension to direct ultrasonication for a period of time sufficient to produce said pristine NGP material.

7. The process as set forth in claim 6, further comprising a step of adding an acid, an oxidizer, or a combination thereof to said suspension for an oxidation treatment of said NGP material.

8. The process as set forth in claim 1, wherein said oxidation treatment comprises exposing said pristine NGP material to a liquid acid or oxidizer solution.

9. The process as set forth in claim 1, wherein said oxidation treatment comprises exposing said pristine NGP material to a liquid acid and/or oxidizer selected from sulfuric acid, nitric acid, carboxylic acid, acetic acid, formic acid, sodium or potassium nitrate, potassium permanganate ($KMnO_4$), sodium or potassium chlorate, hydrogen peroxide ($H_2O_2$), or a combination thereof.

10. The process as set forth in claim 1 wherein said dispersible nano graphene platelet material, when formed into a thin film with a thickness no greater than 100 nm, exhibits an electrical conductivity of at least 10 S/cm.

11. The process as set forth in claim 1 wherein said dispersible nano graphene platelet material, when formed into a thin film with a thickness no greater than 100 nm, exhibits an electrical conductivity of at least 100 S/cm.

12. The process as set forth in claim 1 wherein said dispersible nano graphene platelet material, when formed into a thin film with a thickness no greater than 100 nm, exhibits an electrical conductivity of at least 1,000 S/cm.

13. The process as set forth in claim 1 wherein said nano graphene material has a specific surface area of approximately from 300 $m^2$/g to 2,600 $m^2$/g.

14. The process as set forth in claim 1 wherein said nano graphene platelet material comprises single-layer graphene.

15. The process as set forth in claim 1, further comprising a step of contacting the nano graphene platelet material obtained in step (b) with a reactant such that a functional group is added to a surface or edge of the nano graphene platelet material.

16. The process as set forth in claim 15, wherein said functional group is selected from alkyl or aryl silane, alkyl or aralkyl group, hydroxyl group, carboxyl group, amine group, sulfonate group ($-SO_3H$), aldehydic group, quinoidal, fluorocarbon, or a combination thereof.

* * * * *